(12) United States Patent
Eichenlaub

(10) Patent No.: US 6,590,605 B1
(45) Date of Patent: Jul. 8, 2003

(54) AUTOSTEREOSCOPIC DISPLAY

(75) Inventor: Jesse B. Eichenlaub, Penfield, NY (US)

(73) Assignee: Dimension Technologies, Inc., Rochester, NY (US)

(*) Notice: Subject to any disclaimer, the term of this patent is extended or adjusted under 35 U.S.C. 154(b) by 0 days.

(21) Appl. No.: 09/418,557

(22) Filed: Oct. 14, 1999

Related U.S. Application Data

(60) Provisional application No. 60/104,142, filed on Oct. 14, 1998, and provisional application No. 60/150,789, filed on Aug. 26, 1999.

(51) Int. Cl.[7] .......................... H04N 13/04; H04N 15/00
(52) U.S. Cl. ............................. 348/51; 348/42; 348/57; 348/58; 348/59
(58) Field of Search ........................... 348/51, 56–59, 348/42; 359/462–466; 345/6, 55, 87

(56) References Cited

U.S. PATENT DOCUMENTS

| | | | |
|---|---|---|---|
| 4,717,949 A | | 1/1988 | Eichenlaub |
| 5,264,964 A | | 11/1993 | Faris |
| 5,805,250 A | * | 9/1998 | Hatano et al. ................. 349/96 |
| 5,822,117 A | | 10/1998 | Kleinberger et al. |
| 5,825,541 A | | 10/1998 | Imai |
| 5,875,055 A | | 2/1999 | Morishima et al. |
| 5,956,001 A | | 9/1999 | Sumida et al. ................. 345/55 |
| 6,040,807 A | * | 3/2000 | Hamagishi et al. ............. 345/6 |
| 6,046,849 A | * | 4/2000 | Moseley et al. ............. 359/465 |
| 6,055,013 A | * | 4/2000 | Woodgate et al. ............. 348/59 |
| 6,069,650 A | * | 5/2000 | Battersby .................... 348/59 |
| 6,094,216 A | * | 7/2000 | Taniguchi et al. ............. 348/51 |
| 6,151,062 A | * | 11/2000 | Inoguchi et al. .............. 348/51 |
| 6,239,830 B1 | * | 5/2001 | Perlin ......................... 348/51 |
| 6,271,896 B2 | * | 8/2001 | Moseley et al. .............. 349/15 |
| 2002/0001128 A1 | * | 1/2002 | Moseley et al. ............. 359/465 |

FOREIGN PATENT DOCUMENTS

EP      0829744 A      3/1998

OTHER PUBLICATIONS

Borner, R., "Autostereoscopic lenticular systems", IEE Colloquium on Stereoscopic Television, Oct., 1992.*

Sexton, I, "Parallel barrier display systems", IEE Colloquium on Stereoscopic Television, Oct. 1992.*

* cited by examiner

Primary Examiner—Vu Le
(74) Attorney, Agent, or Firm—Stephen B. Salai, Esq.; Donna P. Suchy, Esq.; Harter, Secrest & Emery LLP

(57) ABSTRACT

An autostereoscopic display includes an image forming device and a substrate having alternating strips, where strips having a first optical property are separated by strips having a different optical property. This substrate may be composed of alternating strips of polarization film separated by clear, nonpolarizing strips. Alternately, this substrate may be composed of first alternating strips that retard a component of linearly polarized light by one-half wavelength, separated by second alternating strips that retard a component of linearly polarized light by one wavelength. A removable, separate polarizing substrate may be removably placed in front of the substrate containing the alternating strips. When the removable polarizing substrate is placed in front of the strips in a certain orientation, autostereoscopic imaging is viewed by the observer, and when this polarizing substrate is removed, 2D imaging is viewed.

28 Claims, 13 Drawing Sheets

AUTOSTEREOSCOPIC DISPLAY

This application claims priority of prior provisional applications Ser. No. 60/104,142, filed Oct. 14, 1998, and Ser. No. 60/150,789, filed Aug. 26, 1999.

BACKGROUND OF THE INVENTION

U.S. Pat. No. 4,717,949 (Eichenlaub) discloses autostereoscopic displays that employ a flat screen on which are displayed a plurality of thin, vertical light emitting lines. An image forming device, such as a liquid crystal display, including rows and columns of pixels is located in front of the screen and forms images by varying the transparency of the individual pixels arranged across its surface. The screen and light valve are arranged so that an observer sees the light emitting lines through one set of pixels with the left eye and the same lines through a different set of pixels with the right eye.

SUMMARY OF THE INVENTION

This invention provides an autostereoscopic display device. Generally, the device comprises an image forming device comprising display pixels arranged in rows and columns; a first substrate comprising alternating strips, the alternating strips comprising strips having a first optical property which are separated by strips having a different, second optical property; and a polarizing substrate, where each of the first substrate and the polarizing substrate is independently optically disposed in front or behind the image forming device.

According to various preferred embodiments, the device includes a first polarizing substrate optically disposed in front or behind the image forming device and having alternating strips of polarization film separated by clear, nonpolarizing strips, and a second polarizing substrate optically disposed in front or behind the image forming device. According to other preferred embodiments, the device includes a light retardation substrate that includes first alternating strips that retard a component of linearly polarized light therethrough by one-half wavelength, said first strips separated by second alternating strips that retard a component of linearly polarized light therethrough by one wavelength. For these embodiments, the alternating strips are preferably arranged vertically. The image forming device may be a transmissive, electronically addressed liquid crystal display, including a liquid crystal layer addressable in an array of individual pixel elements, and the device further comprises a backlight source. Alternately, the image forming device may be an emissive, addressable display with display pixels arranged in rows and columns.

For the embodiments employing the polarizing substrate with alternating strips of polarization film, the device may include a secondary, non-image forming LCD having no pixel structure, where the LC panel is switchable between autostereoscopic image and 2D viewing by application and removal of the voltage to the liquid crystal layer in the secondary LCD.

According to various embodiments, a movable, second polarizing substrate may be removably placed in front of the substrate containing the alternating strips. When the movable polarizing substrate is placed in front of the strips in a certain orientation, autostereoscopic imaging is viewed by the observer, and when this polarizing substrate is removed, 2D imaging is viewed.

BRIEF DESCRIPTION OF THE DRAWING FIGURES

DETAILED DESCRIPTION OF PREFERRED EMBODIMENTS

Figure 1:
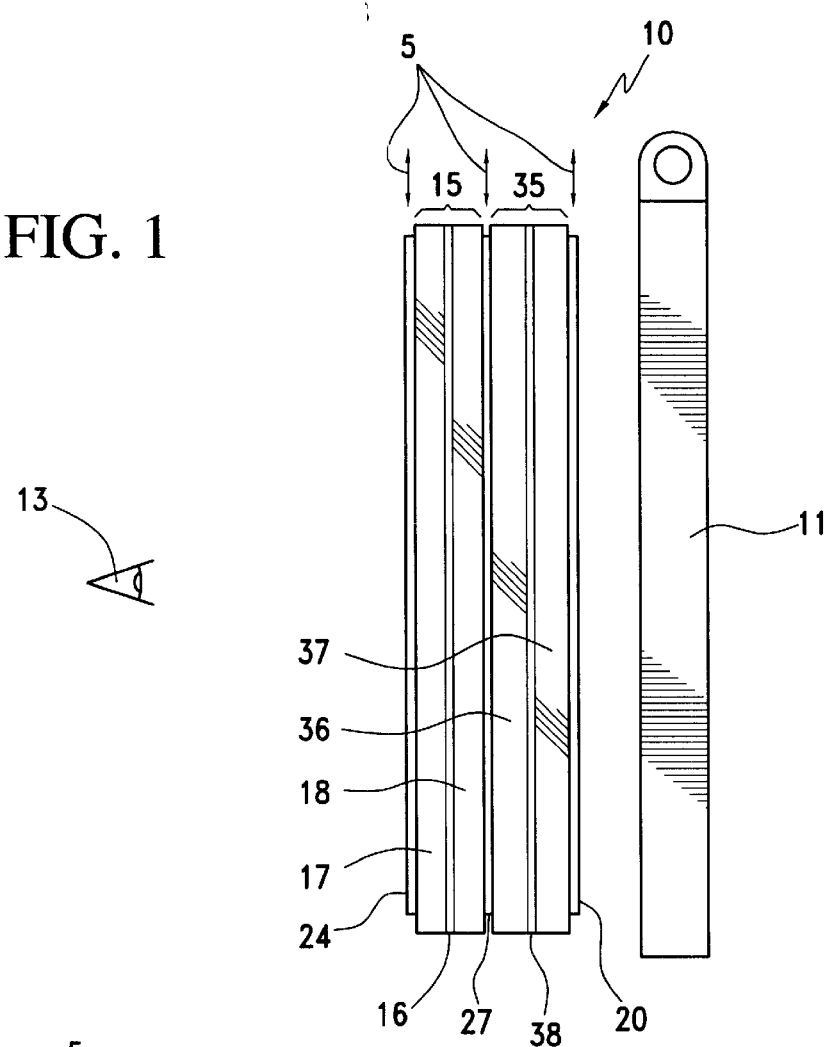
FIG. 1 is a top view of an autostereoscopic display according to a first embodiment.
Figure 2:
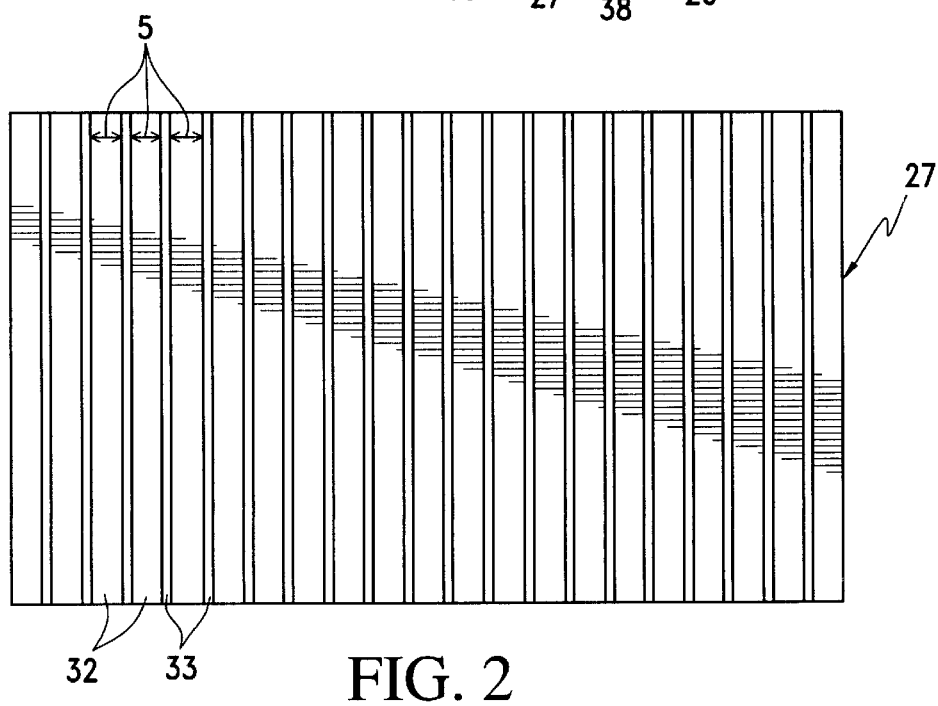
FIG. 2 is a rear view of a polarizer with slits employed in the display of FIG. 1.

The drawing of FIG. 1 shows an autostereoscopic display 10 possessing an analyzer consisting of a first polarized sheet 24 on the front side (the side closest to the observer) of an electronically addressed liquid crystal display 15 composed of two sheets of glass 17, 18 with a liquid crystal layer 16 which can be addressed in an array of individual pixel elements arranged in rows and columns; an optional weak diffuser or diffuse surface in front of the polarizing sheet 24; a second polarizing sheet 27 consisting of vertical strips 32 of polarization film interspersed with clear areas in the form of thin slits 33 which do not polarize the light passing through them (as illustrated in the front view of FIG. 2); a third glass sheet 36; a second liquid crystal layer 38 without pixel structure where the molecular orientation can be changed by applying voltage across its entire surface; a fourth glass sheet 37; a third polarizer 20; and a backlight 11 which normally emits white, diffuse light. For purposes of illustration, it is assumed that the polarization directions of all three polarizing sheets are the same, as illustrated by the arrows 5 above each sheet in FIG. 1 and within the polarizing strips in FIG. 2. However, other directions can be used and it is also possible to use sheets which polarize light in different directions from one another. For example, most LCDs use polarizing directions at 45 degrees from the vertical and horizontal. For purposes of this example, it is also assumed that, when in the off state (no voltage applied), the second liquid crystal layer 38 (the one without a pixel structure) does not change the polarization direction of light passing through it. However, this too can be different depending on the directions of polarization of the polarizers, as will be apparent from the following description of operation of the device.

When no voltage is applied across the second liquid crystal layer 38, light simply passes through it and through the polarized strips 32 of the second polarizing sheet 27, and on through the first liquid crystal layer 16, where voltage applied across individual pixels causes the polarization of the light to turn to various degrees so that light going through different pixels either passes freely through or is extinguished to some degree by the first (front) polarizing sheet 24; thus forming an image which can be viewed by an observer 13 positioned on the other side of that sheet 24, as is normally the case with liquid crystal displays.

When voltage is applied across the second liquid crystal layer 38, the polarization direction of the light passing through it changes by 90 degrees, and is blocked by the polarizing strips 32 in the second polarization layer 27. However, it freely passes through the clear slits 33 between the polarizing strips 32. The polarization direction of light passing through the strips 32 is then changed to varying degrees by the pixels within the first liquid crystal layer 16, so that light passing through different pixels is extinguished to varying degrees by the first polarizing sheet 24, thus forming an image that can be viewed from the opposite side of that sheet.

The spacing of the clear slits 33 on the second polarizing sheet 27 is chosen according to the formula $p=2/((1/w)-(1/e))$ where p is the slit pitch, w is the pixel pitch in the horizontal direction of the first LC layer 16, and e is the average separation of a pair of eyes of the observer 13. Typically, a value of 63 mm is used for e is again used for adult humans. The width of the slits 33 will typically be one-half the width of the polarizing strips 32, since this seems to give the best visual results.

An observer 13 looking at the display 10 with the second liquid crystal layer 38 in this "on" condition sees light coming through the clear slits 33, with wider black areas between them where the polarizing strips 32 are in the second layer 38. He thus sees a liquid crystal display illuminated by light lines behind the pixels of the first LC layer 16. Given the slit pitch formula given above, "viewing zones" will be formed within which the observer sees the light lines line up behind even or odd pixel columns in the first liquid crystal layer 16, according to the principles outlined in U.S. Pat. No. 4,717,949, the entire disclosure of which is incorporated herein by reference. If a left eye image of a stereo pair is displayed on the odd columns of pixels and a right eye image on the even columns or vice versa, the observer will see a stereoscopic image whenever his or her left eye is within a viewing zone where the light lines are visible behind the pixel columns displaying the left eye image, and his or her right eye is simultaneously positioned within a viewing zone where the light lines are visible behind the pixel columns displaying the right eye image, again according to the principles described in U.S. Pat. No. 4,717,949.

Thus by applying voltage to the second LC layer 38 or removing it, the observer can switch between autostereoscopic imaging in which each eye sees every other column of the first LC layer 16 pixels, and ordinary 2D viewing in which each eye sees all the pixels of the first LC layer 16.

When in 3D mode, the operation of the first LC layer 16 must be reversed from when it is in 2D mode. For example, if no voltage across a pixel in 2D mode causes that pixel to show up as a bright spot, then a maximum applied voltage will cause it to show up as a black spot, and a voltage somewhere in between will cause it to appear as a gray spot. In 3D mode, the no voltage condition will cause it to show up as a dark spot while the applied voltage condition will cause it to show up as a bright spot, again with intermediate voltages causing it to appear as a gray spot. This reversal of operation must be taken into account via either hardware or software controlling the first LC layer 16 pixels to ensure that a correct image, instead of a negative image, is displayed in each mode.

It is possible to replace the second liquid crystal layer 38 with one possessing individually addressed rows and columns of pixels of its own. Each pixel would either let light pass through without changing its polarization direction (no voltage applied), or change the polarization direction by 90 degrees (voltage applied). By applying voltage to different groups of pixels in the second liquid crystal layer 38, one can thus create windows within which light lines are visible for 3D viewing surrounded by evenly illuminated 2D areas (without light lines) or vice versa.

Variations on and additions to this basic design are possible. For example it is possible to place neutral, non polarizing filter strips in the gaps 33 between the polarizing strips 32, in order to equalize the amount of light passing through the strips and gaps per unit area, thus achieving greater illumination evenness in 2D mode. The filters would need to block only about 10% to 20% of the light passing through them, depending on the polarizing material used for the strips 32. The filters may be strips of some neutral gray transparent material located within the gaps 33 between the polarizing strips, or they may be formed by exposing thin strips of a photographic emulsion layer on the surface of the glass substrate on which the polarizing strips are applied.

It is also possible to dye the gaps 33 between the polarized strips 32 to achieve this reduction in transmittance. This has been demonstrated and shown to effectively reduce transmittance to match transmittance between the polarizing and nonpolarizing alternating strips.

Another variation may employ depolarizing strips in combination with a continuous sheet polarizer. Instead of using gaps between polarizing strips, one may use a continuous polarizing sheet with thin parallel lines of depolarizing material in the positions where the slits would otherwise be placed. The strips of depolarizing material would have to be placed on the side of the polarizer that faces the liquid crystal layer 38 of the secondary liquid crystal panel.

There are a number of ways to make the polarizing sheets that contain the polarizing strips 32 alternating with the nonpolarizing slits 33. All these methods start with a continuous sheet of polarizing material on a substrate such as glass, and either remove the polarizing material in the areas of slits 33, or eliminate the polarizing properties of the material in these areas of slits 33. Three methods that have been demonstrated experimentally are chemical bleaching, photo bleaching and chemical etching of a continues polarizing sheet, with the aid of etching masks to mask the areas of polarizing strips 32.

The polarizing sheets 20, 24, 27 and strips 32 may function as conventional polarizers, that is, they absorb the component of the light wave that is oscillating in the undesired direction. However, in some cases it is preferred to use a newer type of polarizing film that reflects the component of the light that is oscillating in the undesired direction. This reflected light will reenter the backlight 11, where it will be scattered and some will re emerge with polarization components in the correct direction. The overall brightness of the display will thus be greater. Reflective polarizing film of this type is made by Minnesota Mining & Manufacturing (St. Paul, Minn.), and is called dual brightness enhancing film. It was developed for the purpose of "recycling" light polarized in the undesired direction as described above, thus increasing the brightness of a liquid crystal display.

Figure 3:
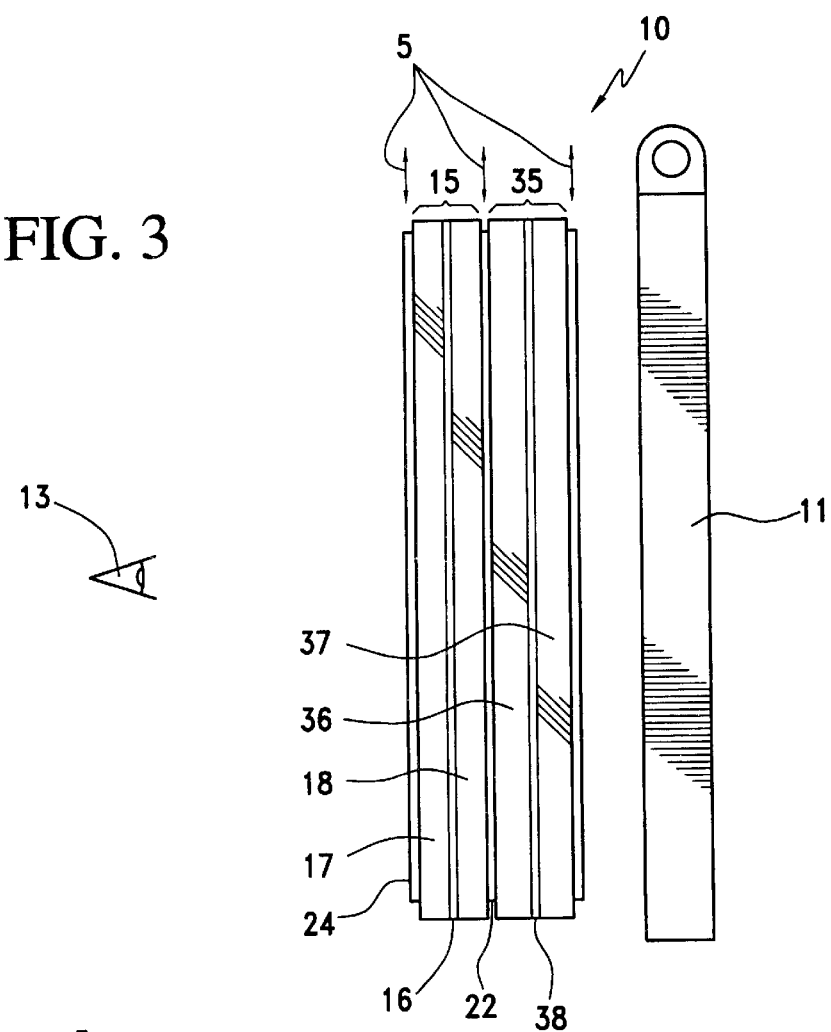
FIG. 3 is a top view of an autostereoscopic display according to a second embodiment.

An alternate configuration is shown in FIG. 3. This configuration possesses the drawback that the polarizing strips 32 must be placed farther away from the LC pixel layer 16, thus forcing the viewing distance farther away from the image forming LCD. This makes it impractical to implement with many LCDs. Nevertheless this arrangement possesses the advantage that the images do not have to be reversed between 2D and 3D modes, which may make it desirable in some circumstances.

Figure 4:
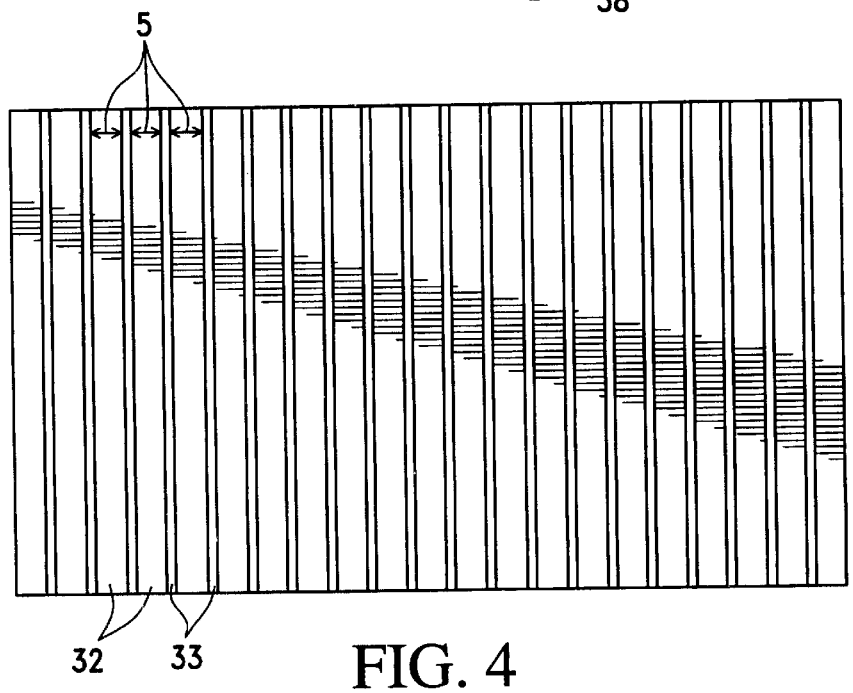
FIG. 4 is a rear view of a polarizer with slits employed in the display of FIG. 3.

FIG. 3 illustrates polarizer 24 on the front of LCD 15, as is typically the arrangement for an LCD bought off the shelf. As before the image forming LCD 15 contains two sheets of glass 17, 18 with a layer of liquid crystal material 16 in between. A third glass sheet 36 is placed behind the rear polarizer 22 of the image forming LCD 15. The second liquid crystal layer 38 without pixel structure is placed between this glass sheet 36 and a fourth glass sheet 36 situated behind it. On the rear of the fourth glass sheet 37 are placed vertical strips 32 of polarization film interspersed with clear areas 33 which do not polarize the light passing through them (as illustrated in the front view of FIG. 4). The backlight 11, which normally emits white, diffuse light is situated behind all the other elements. For purposes of illustration, it is assumed that the polarization directions of all three polarizing sheets are the same, as illustrated by the arrows 5 above each sheet in FIG. 3 and within the polarizing strips 32 in FIG. 4. However, other directions can be used and it is also possible to use sheets which polarize light in different directions from one another. It is also assumed that, when in the off state (no voltage applied, the second liquid crystal layer 38 (the one without a pixel structure) does not change the polarization direction of light passing through it.

When no voltage is applied across the second liquid crystal layer 38, light passing through the polarizing strips 32 and the gaps 33 between them simply passes through it and through the polarized sheet 22 on the back of the image forming LCD 15, then on through the first liquid crystal layer 16, where voltage applied across individual pixels causes its polarization direction to turn to various degrees so that light going through different pixels either passes freely through the frontmost polarizing sheet 24, or is extinguished to some degree by the frontmost polarizing sheet 24; thus forming an image which can be viewed by an observer 13 positioned on the other side of that sheet, as is normally the case with liquid crystal displays.

When voltage is applied across the second liquid crystal layer 38, the polarization direction of the light passing through it changes by 90 degrees. Thus the light that has passed through the strips 32 is blocked by the polarizing layer 22 on the back of the image forming LCD 15. However, light that has passed through the gaps 33 between the polarizing strips 32 still passes freely through the rear polarizer 22 of the image forming LCD 15. The polarization direction of light passing through the gaps 33 is then changed to varying degrees by the pixels within the image forming liquid crystal layer 16, so that light passing through different pixels is extinguished to varying degrees by the front polarizing sheet 24, thus forming an image that can be viewed from the opposite side of that sheet.

The spacing of the clear strips 32 of polarizing material is once again chosen according to the formula $p=2/((1/w)-(1/e))$ where p is the clear slit pitch, w is the pixel pitch in the horizontal direction of the first LC layer, and e is the average separation of a pair of observer's eyes. Typically a value of 63 mm is used for e.

An observer looking at the display with the second liquid crystal layer 38 in the activated ("on") condition sees light coming through the clear slits 33, but dark strips between them where the polarizing strips 32 are located. He thus sees a liquid crystal display illuminated by light lines behind the pixels of the first LC layer. Given the slit pitch formula given above, "viewing zones" will be formed within which the observer sees the light lines line up behind even or odd pixel columns in the first liquid crystal layer 16, according to the principles outlined in U.S. Pat. No. 4,717,949. If a left eye image of a stereo pair is displayed on the odd columns of pixels and a right eye image on the even columns or vice versa, the observer will see a stereoscopic image whenever his or her left eye is within a viewing zone where the light lines are visible behind the pixel columns displaying the left eye image, and his or her right eye is simultaneously positioned within a viewing zone where the light lines are visible behind the pixel columns displaying the right eye image.

Thus by applying voltage to the second LC layer 38 or removing it, the observer can switch between autostereoscopic imaging in which each eye sees every other column of the first LC layer 16 pixels, and ordinary 2D viewing in which each eye sees all the pixels of the first LC layer 16.

As mentioned, for this embodiment it is not necessary to flip the image between positive and negative when changing from 2D to 3D modes. White pixels will appear white and black pixels will appear black regardless of which state the secondary LC layer 38 is in.

It is possible to replace the second liquid crystal layer 38 with one possessing individually addressed rows and columns of pixels of its own. Each pixel would be either let light pass through without changing its polarization direction (no voltage applied), or change the polarization direction by 90 degrees (voltage applied). Ferroelectric liquid crystal materials are ideally suited to this purpose. By applying voltage to different groups of pixels in the second liquid crystal layer 38, one can thus create windows within which light lines are visible for 3D viewing surrounded by evenly illuminated 2D areas (without light lines) or vice versa.

Variations on and additions to this basic design are possible. For example it is possible to place neutral, non polarizing filter strips in the gaps 33 between the polarizing strips 32, in order to equalize the amount of light passing through the strips and gaps per unit area, thus achieving greater illumination evenness in 2D mode. The filters would need to block only about 10% to 20% of the light passing through them, depending on the polarizing material used for the strips. Once again, gaps 33 could be dyed.

Another variation may employ depolarizing strips in combination with a continuous sheet polarizer. Instead of using gaps between polarizing strips, one may use a continuous polarizing sheet with thin parallel lines of depolarizing material in the positions where the slits would otherwise go, on the side facing the image forming LCD 15 and the observer 13. The strips of depolarizing material would have to be placed on the side of the polarizer that faces the liquid crystal layer of the secondary liquid crystal panel.

Figure 5:
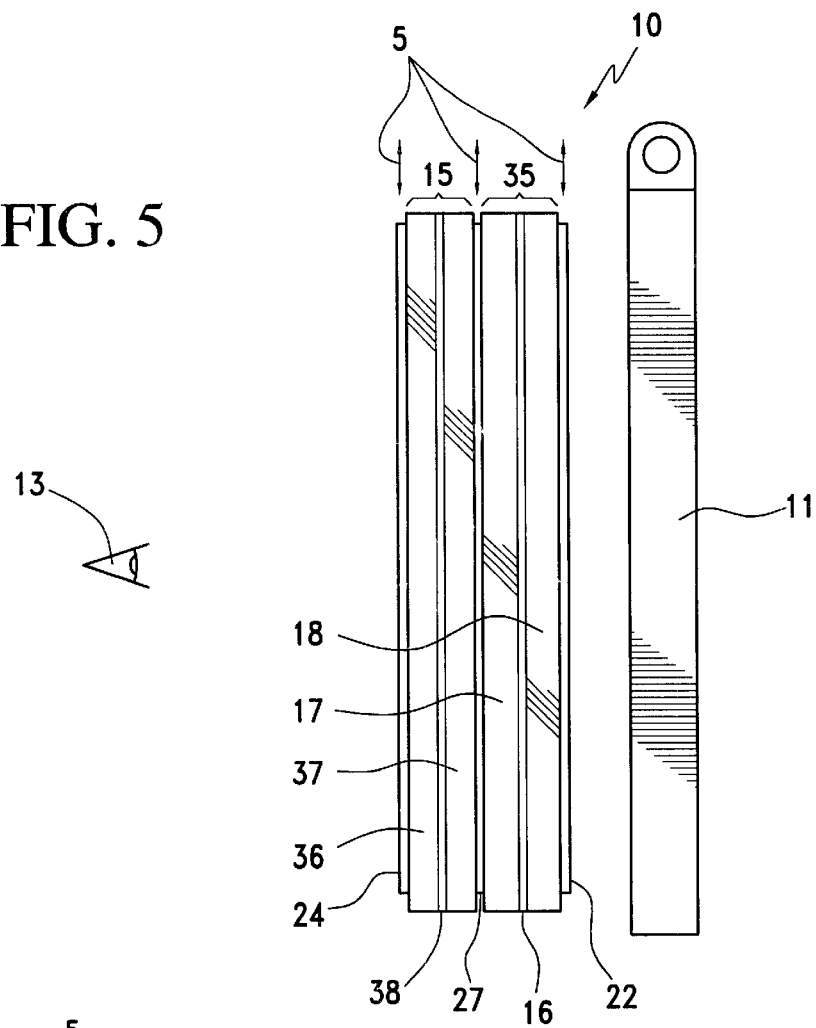
FIG. 5 is a top view of an autostereoscopic display according to a third embodiment.
Figure 6:
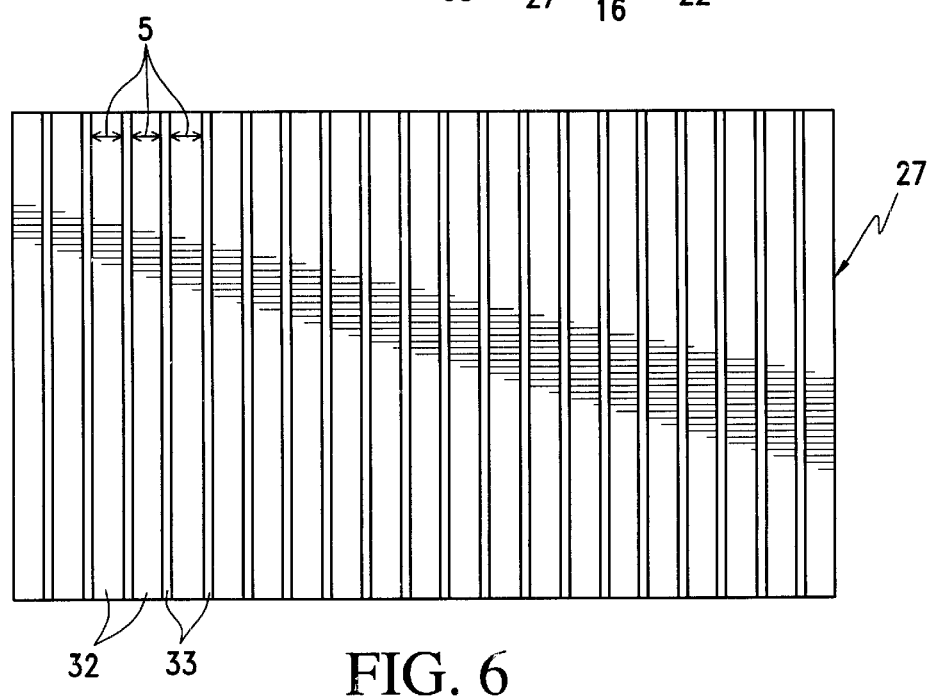
FIG. 6 is a rear view of a polarizer with slits employed in the display of FIG. 5.

According to another embodiment, it is also possible to place the polarizer 27 with slits and the second polarization turning liquid crystal layer 38 on the front side of the image forming LCD 15 (the side toward the observer 13), with the polarizing strips 32 on the front side of the image forming LCD 15, on the side facing the observer. A rear polarizer 22 is provided on the rear of glass sheet 18 of the image forming LCD 15. One such configuration is shown in FIG. 5. Here, the front polarizer 24 of the image forming LCD 15 is removed and is replaced by the polarizing strips in polarizer 27. The secondary LC layer 38 is placed in front of the polarizing strips 32, and a continuous polarizing sheet 24 is placed on the front side of the secondary LC glass 36 (the side facing the observer). In this case the formula for the spacing of the slits 33 between the polarizing strips 32 will be $P=2/(1/w+1/e)$ where P is the pitch of the slits, w is the pixel pitch, and e is the observer's eye separation, which is about 63 mm on average for adult humans. The polarization direction of the polarizing strips is chosen so that light coming from the image forming LCD 15 freely passes through them when the pixels of the image forming LCD 15 are in the white ("on") state. The polarization direction of the front polarizer 24 is chosen so that, when the secondary LC layer is not activated, it also passes light coming from the polarizing strips and also passes any light coming from white ("on") pixels seen through the slits. Thus both the observer's eyes see light coming from all the pixels on the image forming LCD 15, and the polarizing strips 32 are almost invisible to the eye.

When the secondary LC layer 38 is activated, it changes the direction of polarization of light to an orientation 90 degrees from its former orientation on the observer's side, thus causing all light that has gone through the polarizing strips 32 to be blocked, but still letting light from the slits 33 between the polarizing strips 32 to pass through. Under this condition, an observer looking at the display sees the pixels of the image forming LCD 15 through the clear slits 33, but dark strips between them where the polarizing strips 32 are located. Given the slit pitch formula listed above, "viewing zones" will be formed within which the observer sees the slits line up behind even or odd pixel columns in the image forming liquid crystal layer 16, according to general principles that are well known in the art, and are outlined in section 3.6 of chapter 3 of the book *Stereo Computer Graphics and Other True 3D Technologies* (Edited by David McAllister, Princeton University Press, ISBN 0-691-08741-5). The geometry involved is analogous to the case where the LCD is illuminated with slits located behind it. If a left eye image of a stereo pair is displayed on the odd columns of pixels and a right eye image on the even columns or vice versa, the observer will see a stereoscopic image whenever his or her left eye is within a viewing zone where the pixel columns displaying the left eye image are visible through the slits, and his or her right eye is simultaneously positioned within a viewing zone where the pixel columns displaying the right eye image are visible behind the slits, again according to the generally known principles.

In this configuration, the frontmost polarizer 24, the one nearest the observer 13, acts as the analyzer which prevents light polarized in the undesired direction from exiting the system and thus allows one to see the image.

Thus by applying voltage to the second LC layer 38 or removing it, the observer can switch between autostereoscopic imaging in which each eye sees every other column of the first LC layer's pixels, and ordinary 2D viewing in which each eye sees all the pixels of the first LC layer 16.

When in 3D mode, the operation of the first LC layer 16 must again be reversed from when it is in 2D mode. For example, if no voltage across a pixel in 2D mode causes that pixel to show up as a bright spot, then a maximum applied voltage will cause it to show up as a black spot, and a voltage somewhere in between will cause it to appear as a gray spot. In 3D mode, the no voltage condition will cause it to show up as a dark spot as seen through the slits, while the applied voltage condition will cause it to show up as a bright spot, again with intermediate voltages causing it to appear as a gray spot. This reversal of operation must once again be taken into account via either hardware or software controlling the image forming LCD 15 pixels to ensure that a correct image, instead of a negative image, is displayed in each mode.

Figure 7:
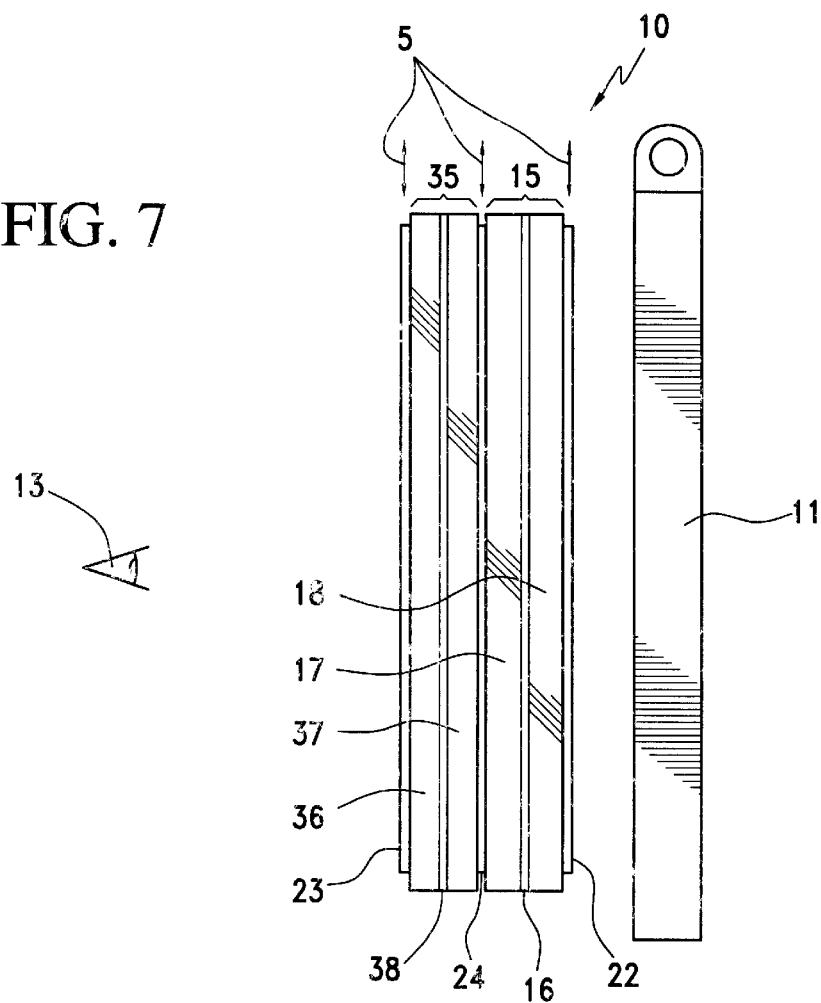
FIG. 7 shows a top view of an autostereoscopic display according to a fourth embodiment.
Figure 8:
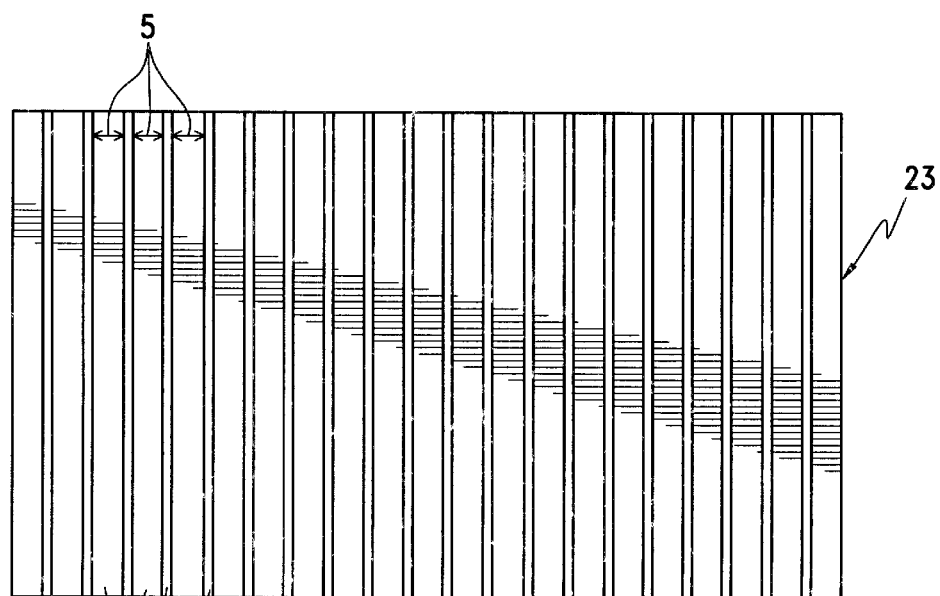
FIG. 8 is a rear view of a polarizer with slits employed in the display of FIG. 7.

Another configuration with the secondary LC layer 38 and the strip polarizers 32 in front of the image forming LCD 15 is shown in FIG. 7. Here, the continuous front polarizer 24 of the image forming LCD 15 is retained. The additional glass sheets 36, 37 and the secondary LC layer 38 are placed in front of this polarizer, and the polarizing strips substrate 23 is placed on the front side of the secondary LC glass 36 (the side closest to the observer 13). In this case the formula for the spacing of the slits will still be $P=2/(1/w+1/e)$ where P is the pitch of the slits, w is the pixel pitch, and e is the observer's eye separation, which is about 63 mm on average for adult humans. The polarization direction of the polarizing strips 32 is chosen so that light coming from the front polarizer 24 of the image forming LCD 15 freely passes through it when the secondary LC layer 38 is not activated (i.e., is "off"). Thus, in this condition the observer will see all pixels with both eyes, and the strips 32 will be nearly invisible.

When the secondary LC layer 38 is activated, it will cause the polarization direction of light passing through it to change to a direction 90 degrees form its former direction. The light will then be blocked by the polarizing strips 32, and the observer will only be able to see light from the image forming LCD 15 through the slits 33 between the polarizing strips 32. As before, because of the spacing of the slits, the observers left eye will see the odd columns of pixels through the slits and the right eye will see the even columns, and a 3D image will be perceived it a left eye view of a stereo pair is displayed on the odd columns and a right eye view on the even columns.

When in this configuration, it is not necessary to reverse the image on the image forming LCD between 2D and 3D modes. White pixels will remain white and black pixels black regardless of the condition of the secondary LC layer.

Any of these "secondary LC in front" configurations of FIGS. 5 to 8 can adapt the design variations described for the "secondary LC behind" configurations of FIGS. 1 to 4. For example, the secondary LCD 35 can take the form of a monochrome LCD with independently addressable pixels in rows and columns or even some other configuration. By activating the pixels in certain areas and not in others, one can create 3D windows in a 2D background or vice versa. It is also possible to place a second series of strips, made of non polarizing neutral density filtering material, within the gaps 33 between the slits 32. These filtering strips can cause the amount of light per unit area coming out of the polarizing strips and slits to be nearly equal. The polarizing strips may also be replaced by a continuous polarizer with lines of a material that depolarize light placed on the side facing the LC layer within the secondary liquid crystal panel, in the same positions as the slits would be.

Figure 9:
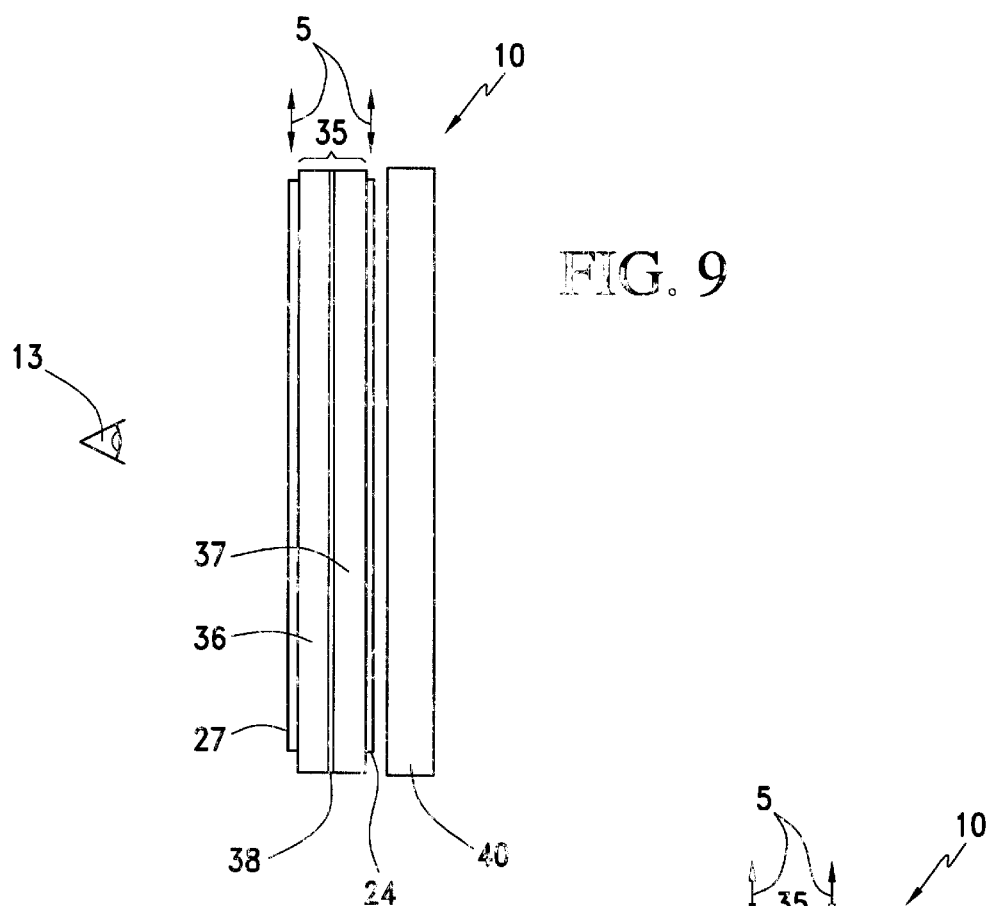
FIG. 9 is a top view of an autostereoscopic display according to a fifth embodiment.
Figure 10:
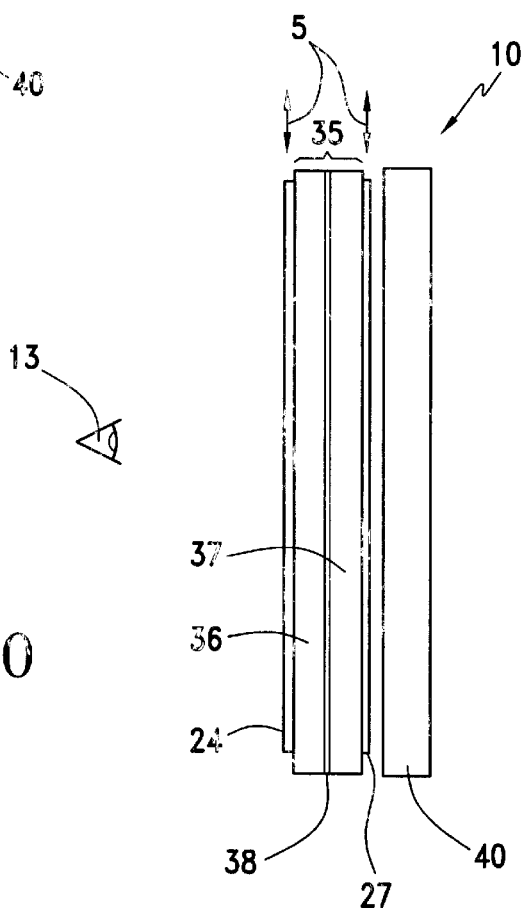
FIG. 10 is a top view of an autostereoscopic display according to a sixth embodiment.

The configurations of FIGS. 5 to 8 with slits placed in front of the image forming LCD 15 can be used with other types of image forming displays other than LCDs. In other words, the image forming device does not have to be transmissive, but it can be emissive. The main requirements are that the display pixels be well defined and be arranged in straight rows and columns. Emissive displays 40 that meet these criteria include plasma displays, electroluminescent (E1) displays, Field Emission Displays (FEDs), and certain types of conventional CRTs. When used with such an emissive display 40, the continuous polarizer 24 must be placed on one side of the LC layer 38 and glass assembly, and the strip polarizers 32 and slits 33 on the other side. The continuous polarizer 24 can be on the front with the strip polarizers 32 on the rear, as shown in FIG. 10, or vice versa, as shown in FIG. 9.

According to other embodiments, this invention provides an autostereoscopic display with retardation film strips and removable polarizer. This configuration of an autostereoscopic display is especially applicable for laptop computers and other portable equipment, due to it being extremely lightweight, thin in cross section, and including relatively low cost autostereoscopic optical components.

Figure 11:
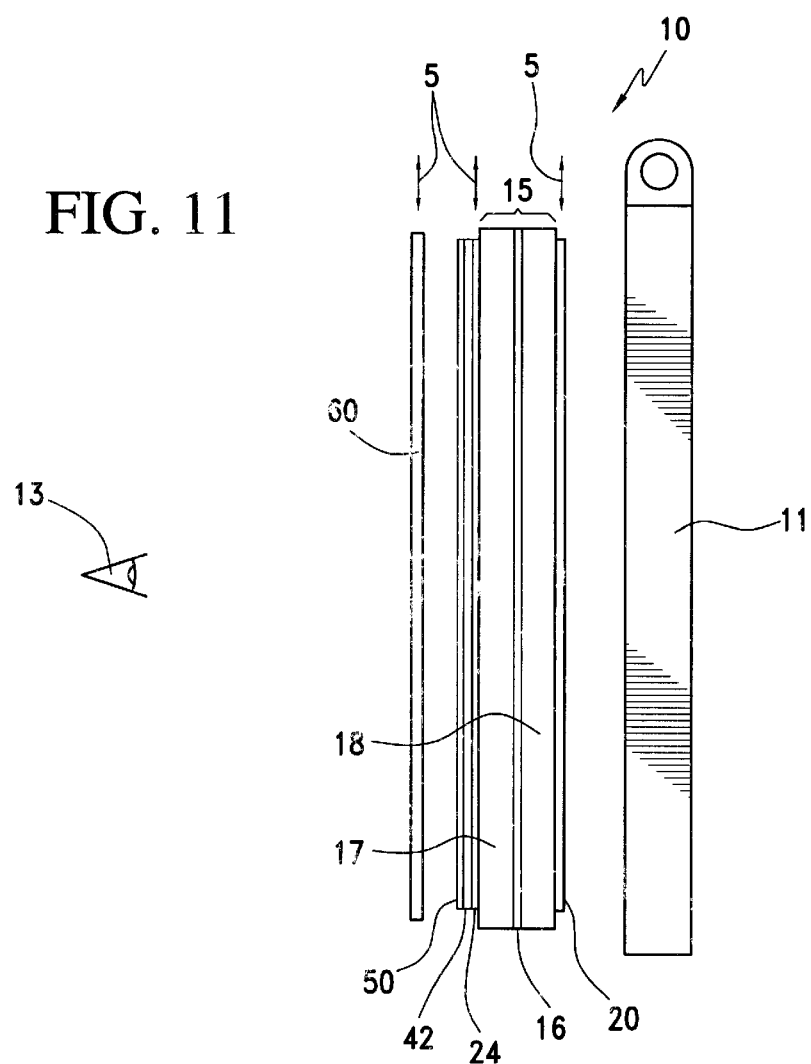
FIG. 11 is a top view of an autostereoscopic display according to a seventh embodiment.

FIG. 11 shows a cross section of an autostereoscopic display 10 using, as its image source, a typical liquid crystal display 15, where the liquid crystal display possesses a polarizing sheet 20 on the far side (i.e., the side facing away from the observer 13 and towards the backlight 11), and another polarizing sheet 24 acting as an analyzer on the front side (i.e., the side closest to the observer 13). In addition to the polarizing sheets 20, 24, the liquid crystal display 15 comprises two sheets of transparent substrate 17, 18, such as glass, with a liquid crystal layer 16 sandwiched therebetween. The liquid crystal layer 16 can be addressed in an array of individual pixel elements arranged in rows and columns to form images. An optional element, in the form of a diffuser 42, may be included in front of the front polarizing sheet 24. This diffuser 42 will ideally blur the pixels of the LCD just to the point where the black boundaries between them become invisible, in order to avoid more effects in autostereoscopic 3D mode.

Figure 12:
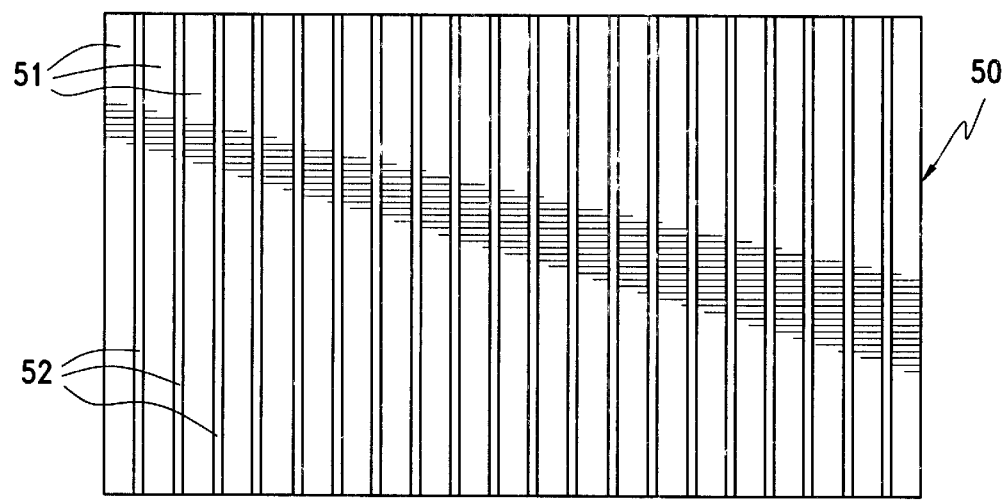
FIG. 12 is a front view of a light-retarding substrate employed in the display of FIG. 11.

A retardation sheet or film 50 comprises alternating vertical strips, one set of strips 51 retarding one component of the linearly polarized light by one-half wave, and the second alternating set of strips 52 retarding one component of the linearly polarized light by one wave, as illustrated in the front view of FIG. 12. Accordingly, the retardation sheet 50 turns the polarization direction of the light. The retardation sheet or film is placed in front of the front polarizer 24 and optional diffuser 42, as shown in FIG. 11.

A third removable polarizing sheet 60, preferably of about the same size and shape as the liquid crystal display 15, may be placed in front of the other elements by the observer, or removed from the display by the observer. For purposes of the following discussion, it is assumed that the polarization directions of the two polarizing sheets 20, 24 are the same, as illustrated by the arrows 5 above each sheet in FIG. 11, and also the same for the removable sheet 60 when it is put in front of the display in the proper orientation, with its long sides parallel to the long sides of the display. However, other directions can be used and it is also possible to use sheets that polarize light in different directions from one another. For purposes of this discussion, it is also assumed that the thin strips 52 of the retardation film 17 in FIG. 12 are one wave sections which change the polarization direction of light passing through them by 360 degrees, and thus result in light polarized in the same direction as when it went in, and the thick strips 51 are one-half wave sections which change the polarization direction of light passing through them by 90 degrees. It is noted that the orientation of the fast axis of the retardation film must be at an angle of 45 degrees to the polarization direction of the light exiting polarizing sheet 24 in order for this to occur.

Figure 13:
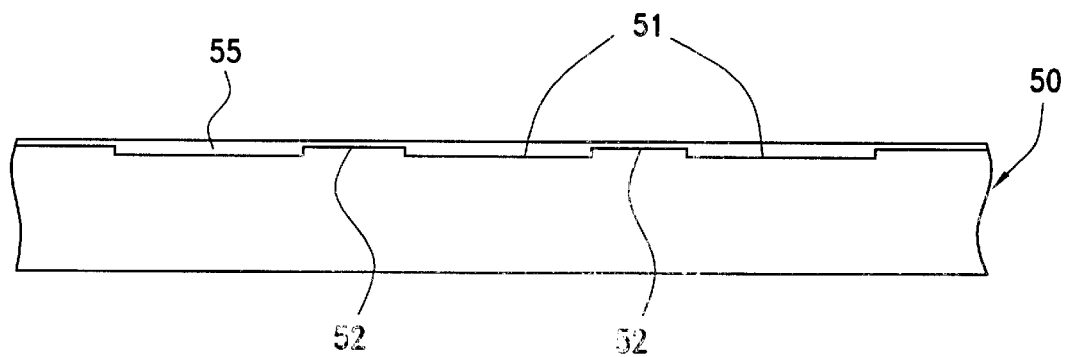
FIG. 13 is a cross-sectional view of the light-retarding substrate of FIG. 12.

Since the strips in the retardation film will typically be formed by starting with a one wave film and etching away the wide sections to create one-half wave strips 51 as shown in the top view cross section of FIG. 13, an additional layer 55 may be added in the form of a laminate with nearly the same index of refraction as the retardation film but without any retardation properties. This layer will prevent diffraction and scatter from the steep face and corners between the one wave and one-half wave strips. Ideally, an anti-reflective coating is also placed on the front side of the laminate 55 to suppress reflections of ambient light sources from the display.

When the removable polarizing sheet 60 is not present, light simply passes through the retardation film 50 to the observer's eyes 13. The polarization direction of the light does not effect its visibility to the eye, so the observer sees all the pixels with each eye, as is usually the case. When the removable polarizing sheet 60 is in place, however, it blocks light that is exiting through the wide strips, since its polarization direction has been turned by 90 degrees. As a result, the observer 13 appears to be looking through a slit barrier placed in front of the LCD.

The spacing of the one wave strips 52 on the retardation film is preferably chosen according to the formula $p=2/((1/w)-(1/e))$ where p is the slit pitch, w is the pixel pitch in the horizontal direction of the LC layer, and e is the average separation of a pair of observer's eyes. Typically a value of 63 mm is used for e, but if the device is to be used for viewing by children, a smaller value is preferably used. The width of the one-half wave strips 51 will typically be twice the width of the one wave strips 52, since this generally provides the best visual results.

An observer looking at the display with the removable polarizer 60 in place sees light coming through the one wave slits 52, with wider black areas between them where the one-half strips 51 are located. He thus sees a liquid crystal display through a barrier of alternating opaque lines and thin transparent slits. For the slit pitch formula given above, "viewing zones" will be formed within which the observer sees the light lines line up behind even or odd pixel columns in the first liquid crystal layer 16, according to the general principles of barrier strip autostereoscopic displays which are well known to the art and outlined in chapter three, section 3.6 of the book *Stereo Computer Graphics and Other True 3D Technologies* (Edited by David McAllister, Princeton University Press, ISBN 0-691-08741-5)—among many other places. If a left eye image of a stereo pair is displayed on the odd columns of pixels and a right eye image on the even columns or vice versa, the observer will see a stereoscopic image whenever his or her left eye is within a viewing zone where the pixel columns displaying the left eye image are visible behind the slits, and his or her right eye is simultaneously positioned within a viewing zone where the pixels displaying the right eye image are visible behind the slits, again according to the principles described in the book referenced above.

Thus by putting the removable polarizer 60 in place or taking it away, the observer can switch between autostereoscopic imaging in which each eye sees every other column of the LC layer 16 pixels, and ordinary 2D viewing in which each eye sees all the pixels of the LC layer 16.

According to an alternate embodiment, an emissive display is used in place of the LCD, in which case a polarizing sheet is placed on the front of it, with a diffuser 15 and the retardation film 17 in turn going on the front of the polarizer.

Figure 22:
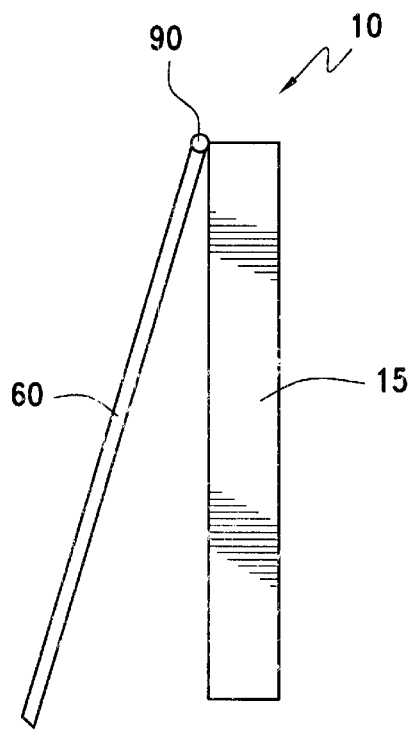
FIG. 22 is side view of a display with a hingedly connected removable polarizer.
Figure 23:
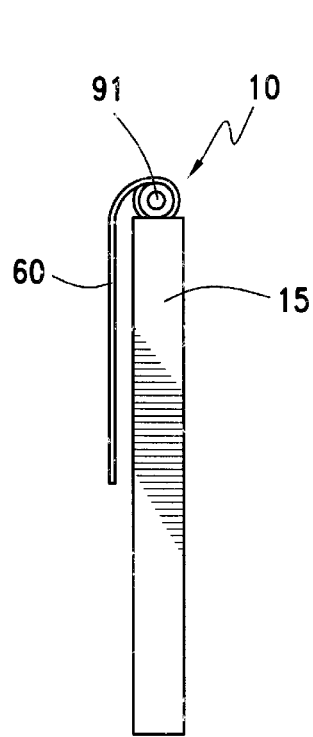
FIG. 23 is a side view of a display with a removable polarizer provided on a roller.
Figure 24:
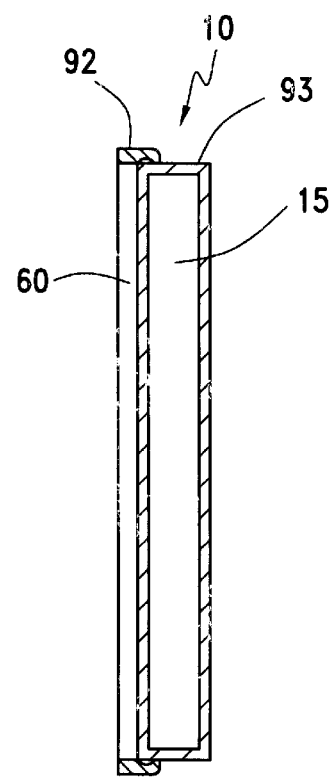
FIG. 24 is a side view of a display with a polarizer mounted in a case removably attached to the image forming display.

In any case, a convenient connection mechanism for the removable polarizer 60 is for the polarizer 60 to be hingedly connected to the display 10, for example, with a hinge 90 at the top of the display 10 (as shown in FIG. 22), whereby the observer may flip the polarizer 60 between a position in front of the display 10 and a position where the polarizer 60 is not in front of the display 10. An advantage of this configuration is that the polarizer is easily moved between the two positions, yet remains permanently attached to the display device so that it does not get lost or damaged. An alternative is to make the removable polarizing sheet 60 very flexible and place it on a roller 91 that would allow it to be rolled down over the front of the LCD 15 and back up again (as shown in FIG. 23). Yet another alternative is to mount the removable polarizer in a rigid frame 92 that removably snaps or clips onto the plastic case 93 surrounding the LCD (as shown in FIG. 24), and is stored in a pocket on the display or laptop case when not in use.

In addition to use on video or computer driven LCD displays, this system may also be used to good effect on certain hand held calculators, personal assistants such as those marketed under the trademark Palm Pilot, and practically any other display device where graphics are presented.

Figure 14:
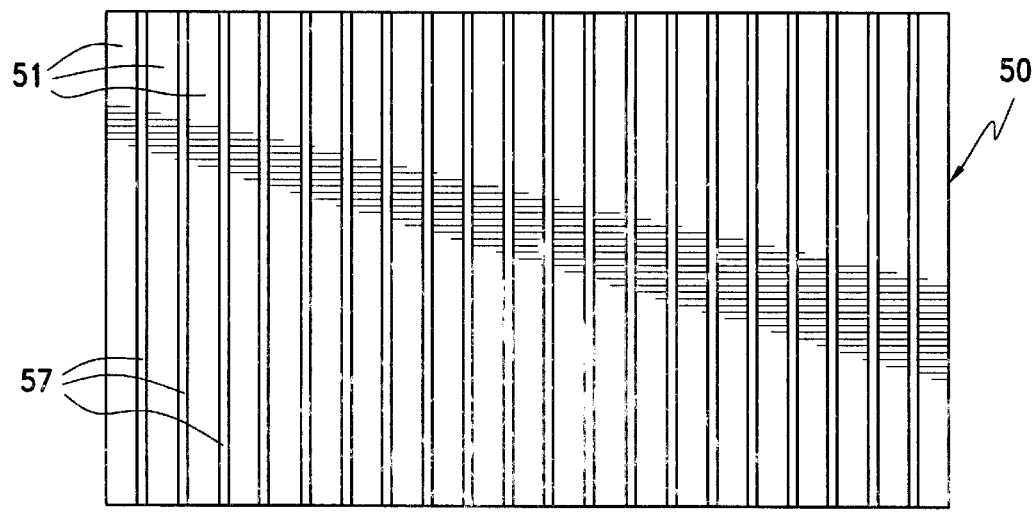
FIG. 14 is a front view of a light-retarding substrate according to another embodiment of this invention.
Figure 15:
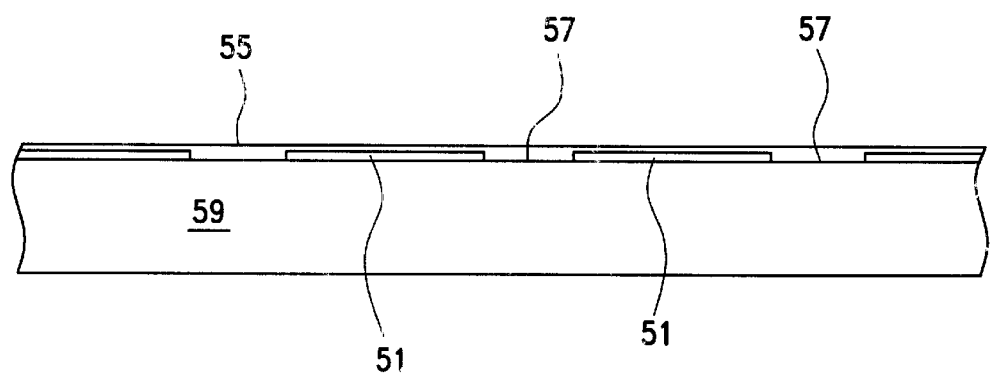
FIG. 15 is a cross-sectional view of the light-retarding substrate of FIG. 14.

An alternate embodiment of the autostereoscopic display is shown in FIGS. 14 and 15. In this embodiment, the thin sections 57 have no retardation film in them at all, so the polarization direction of light does not change at all when passing through them. As in the previously described configuration, the light has the same polarization direction when exiting the thin sections as it did when it went in. The thick strips 51 are one-half wave sections that change the polarization direction of light passing through them by 90 degrees. These strips are mounted on a substrate 59, ideally made of glass, to give the structure rigidity. Under certain circumstances, the glass substrate may be the front glass of the LCD display 15, for example, when optional diffuser 42 is not present. This configuration may be formed by adhering a continuous layer of one-half wave retardation film across one surface of the substrate, then etching it away in the thin sections so that the substrate is exposed. As before, an index matched layer of laminate 55 may be placed over the retardation strips, filling in the gaps between them to prevent scattered and reflected light from the sides and edges of the strips. Once again, to go to 3D mode, the user places a polarizing sheet 60 in front of the display, oriented so that it blocks the light that is exiting the one-half wave sections 51, while allowing the light exiting the thin sections 57 to pass through. Without the polarizing sheet 60 in place, the observer would see light coming through all the sections unimpeded.

Figure 16:
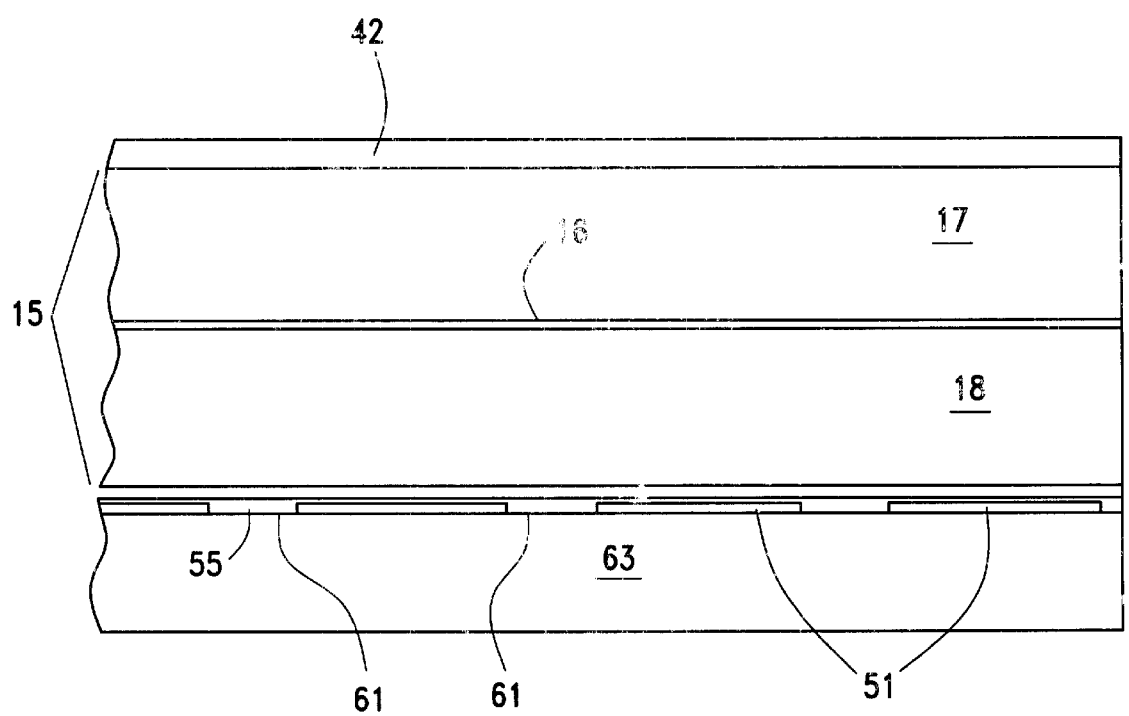
FIG. 16 is a cross-section view of another embodiment of a light-retarding substrate incorporated with an electrooptical device.

FIG. 16 illustrates yet another embodiment of an autostereoscopic display with retardation film strips. This embodiment employs electrooptical means to achieve the 2D/3D function. As in the embodiment of FIGS. 11 to 14, wide strips 51 of retardation film are interspersed with thinner strips 61, and are placed in front of the front polarizer. The thin sections 61 either have no retardation film at all or have sufficient thickness to cause the direction of light passing through them to turn by some multiple of 180 degrees. The polarization direction of light thus does not change at all after passing through the thin section. The thick strips 51 are of sufficient thickness to change the polarization direction of light passing through them by N×90 degrees, where N is an odd integer. These strips are mounted on a substrate 63, ideally made of glass, to give the structure rigidity. This configuration may be formed by adhering a continuous layer retardation film across one surface of the substrate 63, then etching it away in the thin sections 61. As in the previously described configuration, an index matched layer laminate 55 may be placed over the retardation strips, filling in the gaps between them to prevent scattered and reflected light from the sides and edges of the strips.

Image forming LCDs are usually designed so that the polarizers on the front and back allow light to pass which is polarized at 45 degrees to the vertical, in either the clockwise or counterclockwise direction. Thus, for example, if the light exiting the front polarizer 24 is polarized in a direction of 45 degrees clockwise to normal (as seen from the front), then the light will remain polarized at 45 degrees clockwise to the normal after passing through the thin sections 61 in the film laminate 55. When passing through the thicker sections 51 of retardation film, its direction of polarization will be turned by 90 degrees so that it is now at 45 degrees to the vertical in a counterclockwise direction.

A liquid crystal plate 15 with no polarizer on its back may be placed in front of the retardation film strips 51, 61 and their laminate 55 if present. The front polarizer 24 of this LCD is placed with its direction of polarization in either the vertical or horizontal direction, so that one-half of the light from the strips of retardation film 51 and one-half the light from the thin sections 61 between them passes through this polarizer 24 when the LC panel is off. It is assumed for this discussion that the polarization direction of this front polarizer 24 is vertical. Thus, when the LC panel is off, light from both the retardation film strips and the gap between them passes through the polarizer 24 on the front of the LC panel 15, and all pixels of the LCD are clearly and equally visible to both eyes. When the LC panel 15 is turned on, it causes the direction of polarization of light passing through it to turn by 45 degrees in a counterclockwise direction, so that light coming from the retardation film strip is now oriented at 90 degrees from the vertical, and thus is blocked by the polarizer 24 on the front of the LC panel. Light from the thin areas is now oriented in the vertical direction, parallel to the polarization direction of the front polarizer. Thus it passes freely through. The observer thus sees the pixels of the LCD 15 only through the thin sections, and will see a 3D image for the reasons described before, provided that a left eye view and a right eye view are displayed using alternate columns of elements on the LCD.

In this configuration, it is not necessary to change the image to its negative with the LCD when switching between 2D to 3D modes.

Again, since the strips in the retardation film will usually be formed by starting with a one wave film and etching away the wide section to create one-half wave strips, as previously described for the embodiment shown in the top view cross section of FIG. 13, an additional layer may be added in the form of a laminate 55 with nearly the same index of refraction as the retardation film but without retardation properties. This layer will prevent diffraction and scatter from the steep face and corners between the one wave and one-half wave strips. Ideally, an anti-reflective coating is placed on the front side of the laminate to suppress reflections of ambient light sources from the display.

The spacing of the one wave strips on the retardation film is chosen according to the formula $p=2/((1/w)-(1-e))$ where p is the slit pitch, w is the pixel pitch in the horizontal direction of the LC layer, and e is the average separation of a pair of observer's eyes. Typically, a value of 63 mm is used for e, but if the device is to be used for viewing by children, a smaller value would typically be used. The width of the one-half wave strips will typically be twice the width of the one wave strips, since this seems to give the best visual results.

Again, it is possible to use an emissive display in place of the LCD, provided that a polarizing sheet is placed on the front of the emissive display, with a diffuser and the retardation film in turn going on the front of the polarizer.

Generally, in all cases involving the retardation films, it is preferred to place a front polarizer on the LCD that does not have a built in diffusion layer on the exposed surface, as such a diffusion layer can scatter light and cause ghosting. If an LCD with such a diffusion layer on its front polarizer is used, then it is preferably to first bond a smooth sheet of material to the front to disable the diffusion layer. Standard anti-reflective sheets, for example those made by OCLI which have an adhesive layer on one side for easy bonding, can serve this purpose. However, they may have birefringent properties and can de-polarize light coming through the polarizer unless they are oriented in a certain direction. This direction is usually with one of the sides of the original off-the-shelf sheets parallel to the sides of the LCD.

Figure 17:
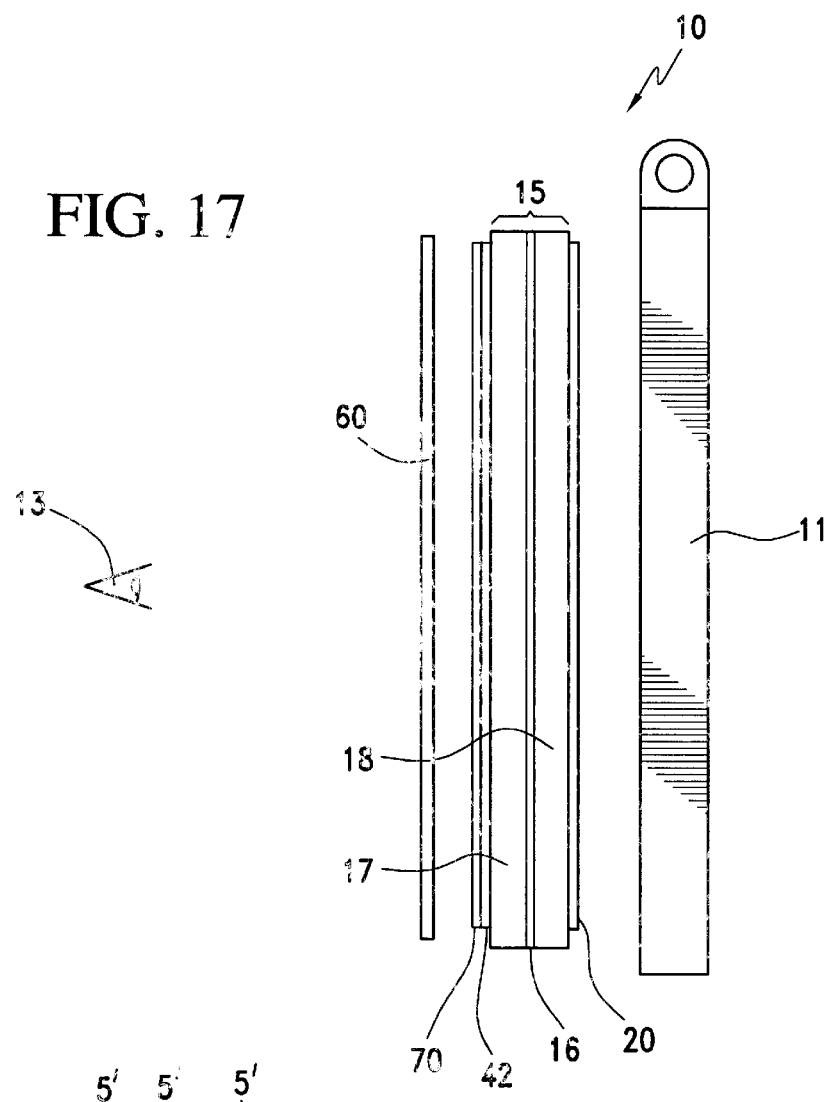
FIG. 17 is a top view of an autostereoscopic display according to another embodiment.
Figure 18:
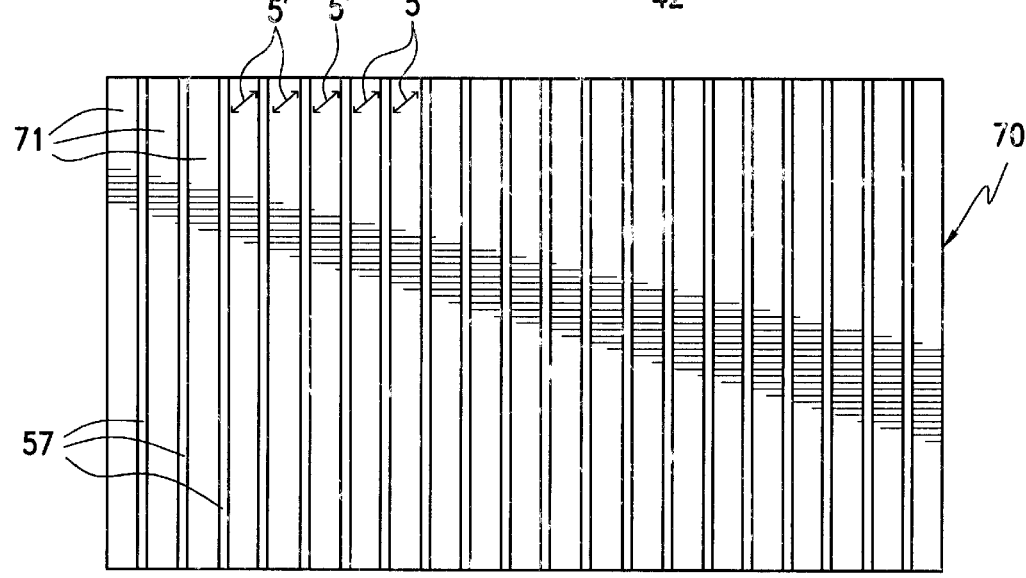
FIG. 18 is a front view of a substrate with polarizing strips employed in the display of FIG. 17.

Another embodiment of a 2D/3D autostereoscopic display is illustrated in FIGS. 17 and 18, and this embodiment involves a sheet of polarizing strips 71 on the front side of the image forming LCD 15 (the side toward the observer). Here, the front polarizer of the image forming LCD is removed and is replaced by the polarizing strips 71. In this case the formula for the spacing of the slits between the polarizing strips will be $P=2/(1/w+1/e)$ where P is the pitch of the slits, w is the pixel pitch, and e is the observer's eye separation, which is about 63 mm on average for adult humans. The linear polarization direction of the polarizing strips 71 will typically be chosen so that light coming from the image forming LCD 15 freely passes through them when no power is applied to the image forming LCD (this is called a naturally white configuration, and is typical of LCDs manufactured today).

The polarization direction of the strips 71 will also ideally be at a 45 degree angle as shown by arrows 5'. This orientation is typical of the vast majority of LCDs. A second polarizing sheet 18 is provided to the observer 13. This sheet is separate, or removable, from the LCD assembly, so that the observer can put it in place and reorient it as necessary. This sheet will also have a linear polarization in a direction at 45 degrees to the sides. By placing this separate sheet 60 on the front of the LCD in such an orientation that its polarization direction is parallel to the polarization direction of the strips 71 on the LCD, light is allowed to pass freely through the strips and the polarizer. Thus both the observer's eyes see light coming from all the pixels on the image forming LCD, and the polarizing strips are almost invisible to the eye.

Figure 19:
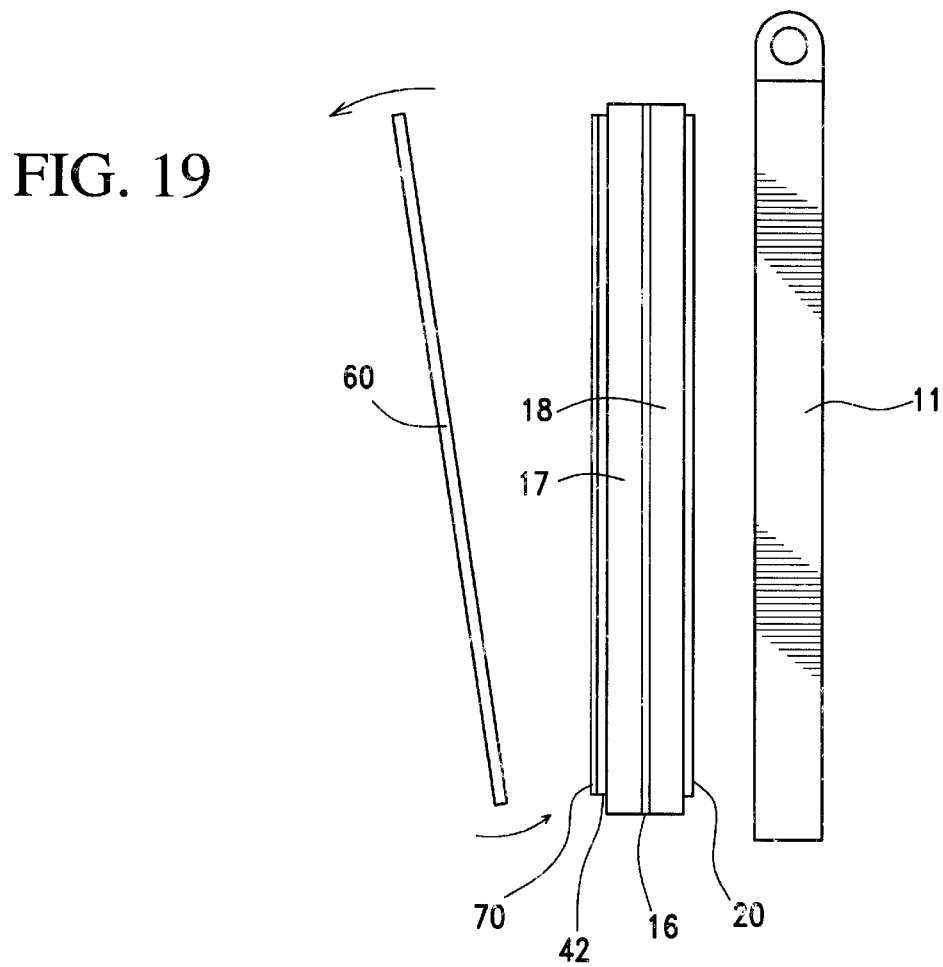
FIG. 19 is a top view of the display of FIG. 17, illustrating flipping of the removable polarizer.

By holding the separate polarizing sheet 60 and flipping it end over end about the horizontal line through its center and parallel to the long sides, the observer can place it in an orientation that causes it's polarization direction to be perpendicular to the polarization direction of the polarizing strips. This is illustrated in FIG. 19. Thus, the separate polarizer 60 now blocks all light coming through the polarizing strips 71, thus allowing the observer to see pixels of the image forming LCD 15 only through the gaps between the polarizing strips. Given the slit pitch formula listed above, "viewing zones" will be formed within which the observer sees the slits line up in front of the even or odd pixel columns in the image forming liquid crystal layer, according to general principles known in the art. If a left eye image of a stereo pair is displayed on the odd columns of pixels and a right eye image on the even columns or vice versa, the observer will see a stereoscopic image whenever his or her left eye is within a viewing zone where the pixel columns displaying the left eye image are visible through the slits, and his or her right eye is simultaneously positioned within a viewing zone where the pixel columns displaying the right eye image are visible behind the slits, again according to the general principles known in the art.

Thus, by flipping over the separate polarizer 60, the observer can switch between autostereoscopic imaging in which each eye sees every other column of the image forming LCD 15 pixels, and ordinary 2D viewing in which each eye sees all the pixels of the image forming LCD.

When in 3D mode, the operation of the image forming LCD must again be reversed from when it is in 2D mode. For example, if no voltage across a pixel in 2D mode causes that pixel to show up as a bright spot, then a maximum applied voltage will cause it to show up as a black spot, and a voltage somewhere in between will cause it to appear as a gray spot. In 3D mode, the no voltage condition will cause it to show up as a dark spot as seen through the slits, while the applied voltage condition will cause it to show up as a bright spot, again with intermediate voltages causing it to appear as a gray spot. This reversal of operation must once again be taken into account via either hardware or software controlling the image forming LCD's pixels to ensure that a correct image, instead of a negative image, is displayed in each mode.

Another configuration that is possible, but not as convenient, is to allow a gap between the strip polarizers and the front of the image forming LCD. For example, the strip polarizers may be formed on a rigid substrate which is spaced apart from the front glass of the LCD by a small amount (typically no more than several thousandths of an inch). The separate polarizer slides down between the image forming LCD and the substrate on which the polarizing strips are mounted. Once again, by placing it in one orientation with its polarization direction parallel to that of the polarizing strips, full resolution 2D images can be viewed.

By sliding it in with its polarization direction opposite to that of the polarizing strips, 3D images can be viewed.

Figure 20:
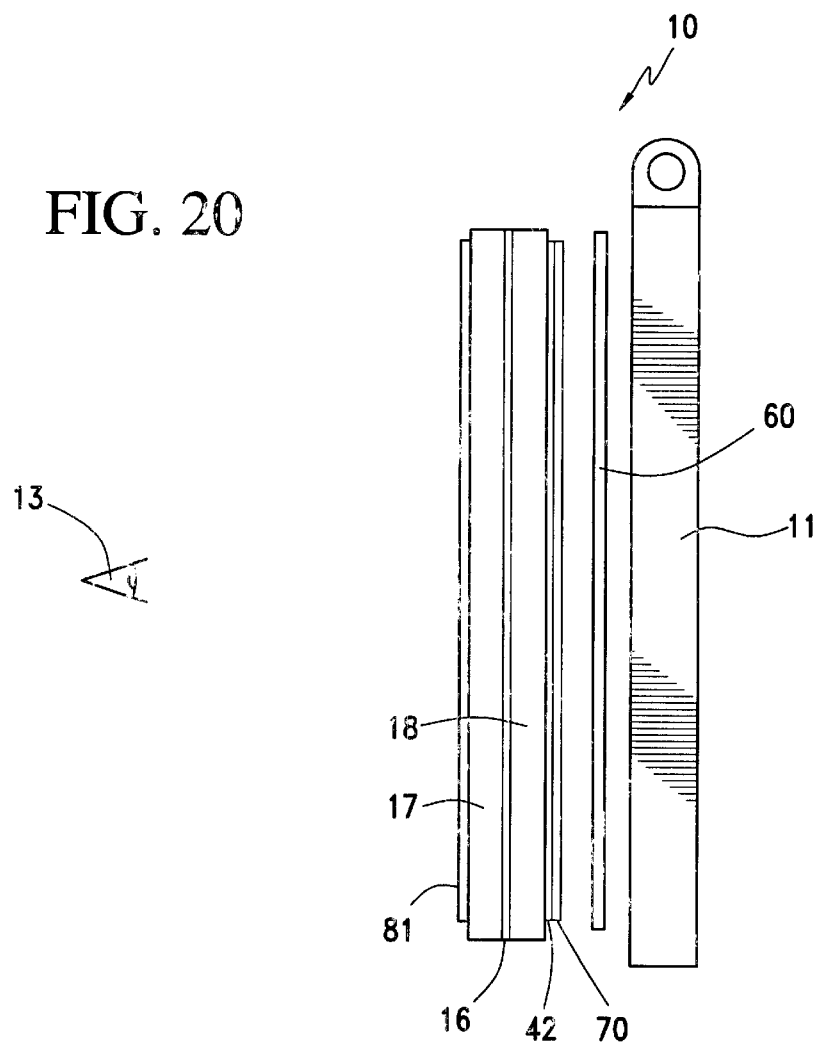
FIG. 20 is a top view of another embodiment employing a removable polarizer.
Figure 21:
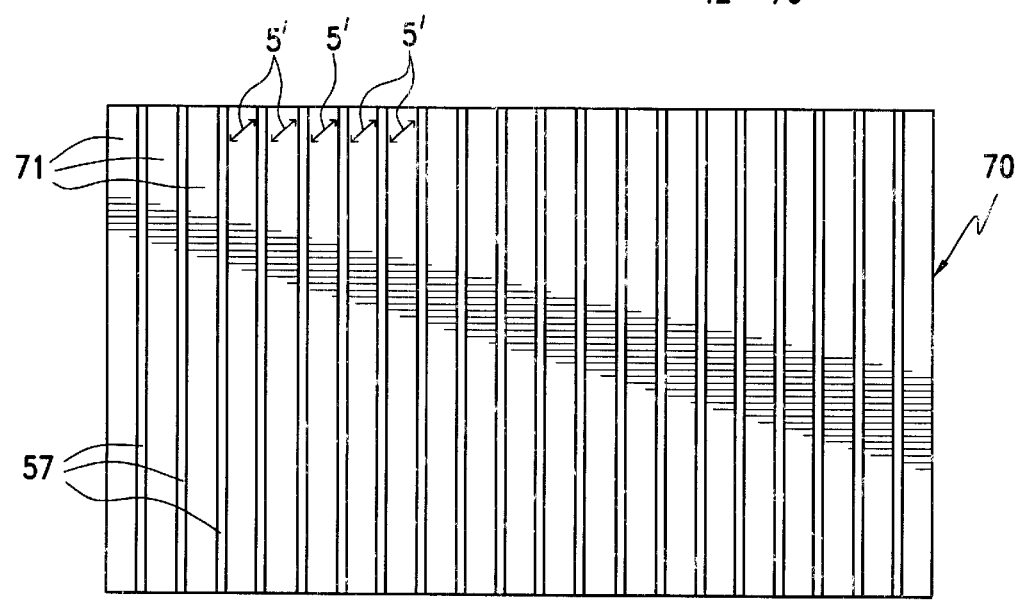
FIG. 21 is a top view of yet another embodiment employing a removable polarizer.

Another embodiment involves a removable, flipping polarizer and polarizing strips on the rear side of the image forming LCD (the side away from the observer). This configuration is shown in FIGS. 20 and 21. In this embodiment, the rear polarizer of the image forming LCD is removed and is replaced by the sheet 70 of polarizing strips 71. In this case the formula for the spacing of the slits between the polarizing strips will be P=2/(1/w−1/e) where P is the pitch of the slits, w is the pixel pitch, and e is the observer's eye separation, which is about 63 mm on average for adult humans. The linear polarization direction of the polarizing strips will typically be chosen so that light exiting them passes freely through the image forming LCD and the front polarizer 81 when no power is applied to the image forming LCD (this is called a naturally white configuration, and is typical of LCDs manufactured today).

The polarization direction of the strips 71 will also ideally be at a 45 degree angle as shown by arrows 5'. A second polarizing sheet 60 is provided to the observer. This sheet is separate from the LCD assembly, so that the observer can put it in place and reorient it as necessary. This sheet will also have a linear polarization in a direction at 45 degrees to the sides. By placing this separate sheet 60 between the backlight 11 and the polarizing strips 71 of the LCD in such an orientation that its polarization direction is parallel to the polarization direction of the strips on the LCD, light is allowed to pass freely through the strips and the polarizer. Thus both the observer's eyes see light coming from all the pixels on the image forming LCD, and the polarizing strips are almost invisible to the eye.

By removing the polarizing sheet 60 and flipping it end over end about the horizontal line through its center and parallel to the long sides, the observer can replace it between the backlight 11 and polarizing strips 71, this time in an orientation that causes its polarization direction to be perpendicular to the polarization direction of the polarizing strips. Thus, the polarizing strips 71 now block all light coming through the removable polarizer 60, but the light passes freely through the gaps between the strips. Thus the observer sees lines of light behind every other pixel of the image forming. Given the slit pitch formula listed above, "viewing zones" will be formed within which the observer sees the slits line up behind the even or odd pixel columns in the image forming liquid crystal layer, according to the principles that are outlined in U.S. Pat. No. 4,717,949, the disclosure of which is incorporated herein by reference. If a left eye image of a stereo pair is displayed on the odd columns of pixels and a right eye image on the even columns or vice versa, the observer will see a stereoscopic image whenever his or her left eye is within a viewing zone where the pixel columns displaying the left eye image are visible in front of the slits, and his or her right eye is simultaneously positioned within a viewing zone where the pixel columns displaying the right eye image are visible in front of the slits, again according to the principles described in U.S. Pat. No. 4,717,949.

When in 3D mode, the operation of the image forming LCD must again be reversed from when it is in 2D mode. For example, if no voltage across a pixel in 2D mode causes that pixel to show up as a bright spot, then a maximum applied voltage will cause it to show up as a black spot, and a voltage somewhere in between will cause it to appear as a gray spot. In 3D mode, the no voltage condition will cause it to show up as a dark spot as seen through the slits, while the applied voltage condition will cause it to show up as a bright spot, again with intermediate voltages causing it to appear as a gray spot. This reversal of operation must once again be taken into account via either hardware or software controlling the image forming LCD's pixels to ensure that a correct image, instead of a negative image, is displayed in each mode.

Another configuration that is possible, but not as convenient, is to allow a gap between the strip polarizers 71 and the rear of the image forming LCD 15. For example, the strip polarizers 71 may be formed on a rigid substrate which is spaced apart form the rear glass 18 of the LCD by a small amount (typically no more than several thousandths of an inch). The separate polarizer 60 slides down between the image forming LCD 15 and the substrate 70 on which the polarizing strips 71 are mounted. Once again, by placing it in one orientation with its polarization direction parallel to that of the polarizing strips, fill resolution 2D images can be viewed. By sliding it in with its polarization direction opposite to that of the polarizing strips, 3D images can be viewed.

The following describes holographic diffuser arrangements suitable for reducing, and in some cases eliminating, the visibility of moire patterns as commonly encountered in many prior 3D display systems. These embodiments are applicable to the various systems involving strips of retardation film, or strips of polarization film, in front of or behind the display, which are described above, as well as existing 3D display systems such as supplied by Dimension Technologies Inc. (DTI, Rochester, N.Y.). Generally, the first, simplest arrangement works best with the systems employing polarizing strips and clear slits in front of a display, such as those described above, or with the systems involving strips of retardation film in front of the display, which are described above, or with an opaque parallax barrier slit mask in front of the LCD. The second is a variation that can be employed with systems that use lines of light behind an LCD formed by any one of many different means including polarizing strips, strips of retardation film, and opaque parallax barrier slit masks.

In some cases, it may be desirable to include a diffuser, especially for the described embodiments employing the substrate with polarizing strips on the front of the display, or for the embodiments employing a light-retarding substrate on the front of the display. A diffuser designed for use with the front strip arrangements works by blurring the pixels seen behind it until the gap between them disappears. Ideally, the diffuser should distribute light as evenly as possible within the blurred pixel image, and also blur the images as sharply as possible. Perfectly sharp images with perfectly even distribution and no dark gaps between pixels would result in total elimination of moire lines.

The nearest approach to this ideal diffusion pattern is provided by a diffuser that diffuses light in only the horizontal direction, and has what is commonly referred to in the industry as a "top hat" distribution pattern in which light from any single point is spread across a sharply defined angle and the light is evenly spread across that angle. Such diffusers can easily be made using holographic or diffractive grating techniques. However, one runs into a problem associated with the fact that the spread angles required are very small, typically between 1 and two degrees. This implies that the holographic patterns or diffractive structures need to be fairly large, and in fact can wind up being nearly as large as the pixels. Such structures cannot blur light from individual pixels evenly, even through the overall pattern is even. This results in "sparkle" like effects in the image and unwanted scattered light, which causes ghosting.

One can get around this problem by starting with an one directional diffuser that scatters light across a large angle (for example 10 to 20 degrees) in only one direction, and making that direction nearly vertical, but tilted slightly around the axis normal to the diffuser, so that a the largest component of the a scattering vector is oriented along the vertical axis, but a small component of the scattering vector is oriented along the horizontal axis. Experiments performed with a diffuser that scattered light in a single direction across about +/−20 degrees revealed that a tilt angle of 10 degrees off the vertical was sufficient to nearly eliminate the moiré patterns. Thus light is spread by an appropriate amount in the horizontal direction. Since the spread angle is large, the structures on the diffuiser will be small, and furthermore will be oriented in a nearly horizontal direction. Thus an even and precisely controlled scattering pattern can be achieved.

In practical arrangements, the pixels will be diffused so much in the vertical direction that they overlap slightly, but this does not cause a problem because the amount of overlap is so small that the eye cannot see it.

Ideally this type of diffuser should be placed between the LCD and the slit forming structure in front of it, and furthermore should be placed as close to the slit structure as possible.

In the situation where light lines are situated behind the image forming LCD, a diffuser in the form of strips may be needed, such as described in U.S. patent application Ser. No. 09/050,440, the disclosure of which is incorporated herein by reference. In this arrangement, the diffuser must take the form a flat substrate possessing alternating strips of clear area and strips that diffuse light passing through them. The diffusing strip layer must be placed near a certain plane located in front of the LCD pixels, and furthermore must be aligned with the light lines and the pixel columns of the LCD.

When fabricating the slits, one runs into the same problem regarding the small diffusion angles and the resultant structure size. The diffracting structures have to be so large that only a small number will fit within each of the strips. This means that the diffusion pattern from each strip cannot be shaped precisely, and also can result in unwanted orders of diffraction that cast some light into the wrong viewing zones and thus cause ghosting.

A solution to this problem is to start once again with a grating or holographlic pattern that diffuses light by a large angle in one direction, this direction being tilted be several degrees from the vertical, the exact angle being dependent on the width of the pixel boundaries and the angle of diffusion. This grating or holographic pattern is ideally formed in a thin layer, such as epoxy or thin plastic, that can be etched, and is bonded to a rigid substrate. Thin vertical strips are then formed in this layer by etching away precisely spaced strips, leaving a pattern of striped diffusers like that shown in patent application Ser. No. 09/050,440, except that the angle of diffusion is larger and is tilted by a certain angle from the vertical.

In either of the cases above (polarizing or retardation strips in front of the LCD or light lines behind) a lenticular lens array with a very fine lens pitch (many lenses per pixel) can be used instead of the holographic or grating diffusers. Such lens arrays are commonly used as one directional diffusers for precise light control in projection screens and other applications. The lenticular (cylindrical) lenses would be oriented with their long dimension tilted slightly from the horizontal, which would cause the direction of diffusion to be tilted slightly from the vertical.

Figure 25:
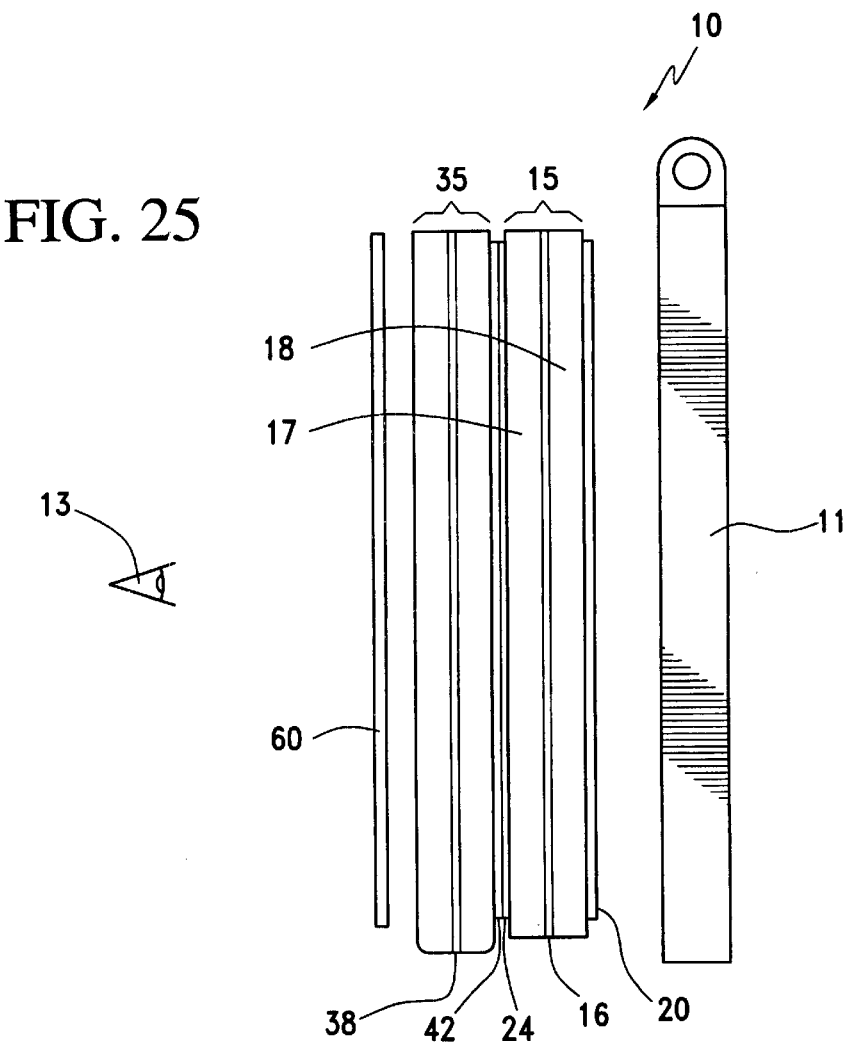
FIG. 25 is a top view of an autostereoscopic display according to another embodiment.
Figure 26:
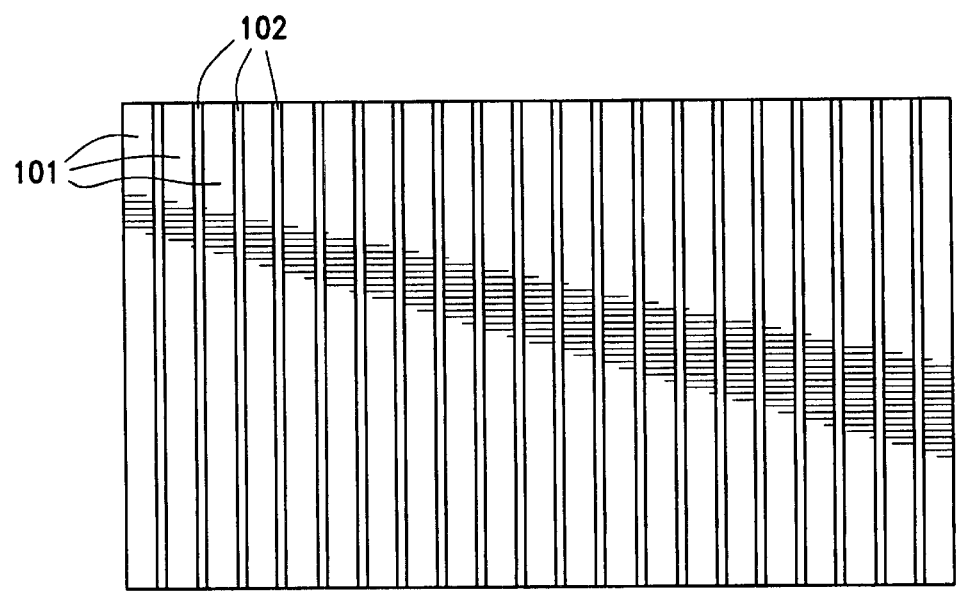
FIG. 26 is a front view of the secondary LCD employed in the display of FIG. 25.

FIGS. 25 and 26 illustrate another embodiment of this invention. The autostereoscopic display 10 employs an image forming LC) 15 having a polarizing sheet 20 on the far side (the side facing away from the observer 13 and towards the backlight 11), and another polarizing sheet 24 acting as an analyzer on the front side (the side closest to the observer 13). In addition to these polarizing sheets, the liquid crystal display includes two sheets of glass 17, 18 with a liquid crystal layer 16 which can be addressed in an array of individual pixel elements arranged in rows and columns, to form images. In the illustrated embodiment, a diffuser 42 is placed in front of the front polarizing sheet 24. This diffuser 42 will ideally blur the pixels of the LCD 15 just to the point where the black boundaries between them become invisible to the observer, in order to avoid moire effects often encountered in autostereoscopic 3D mode. The diffuser 42 may have the form of a single diffuser with a relatively great degree of diffusion in a direction titled slightly from the vertical (for example, 5 degrees to 10 degrees) so that a small and precisely controlled amount of diffusion occurs in the horizontal direction.

A secondary LCD 35 with no polarizer attached is placed in front of the image forming LCD 15. This LCD 35 has electrodes 101 placed adjacent to its LC layer 38 in a vertical strip pattern, as best seen in FIG. 26. When the electrodes 101 are activated, the LC molecules are turned, or otherwise reoriented or affected, so that the polarization direction of the light going through these strips 101 is turned, ideally by ninety degrees or some multiple thereof. The liquid crystal material in layer 38, generally, should be a ferroelectric material or other LC material with the property that when voltage is applied, causing the molecules to turn, the molecules will remain in this turned orientation even when the voltage is turned off. Accordingly, the secondary LCD 35 may be placed in this state where the LC layer 38 under the electrode strips 101 is in its "active" (polarization turning) state during assembly, and permanently left this way without power. If necessary, voltage can be applied to the secondary LCD layer 38 again for a short period of time whenever the display is turned on, and perhaps periodically throughout the period the display 10 is being used, in order to ensure the LC molecules remain in the correct orientation while the display is in use.

A third, removable polarizing substrate 60, of about the same size and shape as the liquid crystal displays, may be placed in front of the other elements, or taken away by the observer 13. The polarization direction of the removable polarizer 60 will generally be the same as the polarization direction of the polarizer 24 on the front of the image forming LCD 15 when the removable polarizer 60 is placed on the front of the display 10 in its proper orientation.

When the removable polarizing substrate 60 is not present, light simply passes through the secondary LCD 35 to the observer 13. The polarization direction of the light does not affect its visibility to the eye, so the observer sees all the pixels of the image forming LCD 15 with each eye, as is usually the case. When the removable polarizing substrate 60 is in place, however, it blocks light that is exiting through the wide electrode strips 101, since its polarization direction has been turned by 90 degrees, while allowing light to pass that has exited through the thin strips 102 between the electrodes 101. As a result, the observer appears to be looking through a slit barrier placed in front of the LCD.

The spacing of the strips 102 between the electrodes 101 in the secondary LCD 35 is chosen according to the formula $p=2/((1/w)-(1/e))$ where p is slit pitch, w is pixel pitch in the horizontal direction of the LC layer in the electronically addressed liquid crystal display 15, and e is average separation of eyes of an observer. As for the previous embodiments, a typical value of 63 mm is used for e, based on the average eye separation of adults, but if the device is specifically designed for viewing by children, a smaller value would be used. The width of the electrodes 101 will typically be twice the width of the strips 102.

An observer looking at the display with the removable polarizer 60 in place sees light coming through the thin slits 102, with wider black areas between them where the direction of polarization has been changed. The observer thus sees a liquid crystal display through a barrier of alternating opaque lines and thin transparent slits. Given the slit pitch formula given above, "viewing zones" will be formed within which the observer sees the light lines up behind even or odd pixel columns in the first liquid crystal layer 16, according to the general principles discussed previously. If a left eye image of a stereo pair is displayed on the odd columns of pixels and a right eye image on the even columns or vice versa, the observer will see a stereoscopic image whenever his or her left eye is within a viewing zone where the light lines are visible behind the pixel columns displaying the left eye image, and his or her right eye is simultaneously positioned within a viewing zone where the light lines are visible behind the pixel columns displaying the right eye image.

Thus by positioning the removable polarizer 60 in place, or by removing its, the observer can switch between autostereoscopic imaging in which each eye sees every other column of the first LC layer 16 pixels, and ordinary 2D viewing in which each eye sees all the pixels of the first LC layer 16. The removable polarizer 60 may have the form described with reference to FIG. 22, 23 or 24.

It is also possible to use an emissive display in place of a transmissive image forming LCD, provided that a polarizing sheet is placed on its front, with a diffuser and the secondary LCD and the removable polarizer placed in front of this polarizing sheet.

The polarizing sheets 20, 24, and strips 102, may function as conventional polarizers, that is, they absorb the component of the light wave that is oscillating in the undesired direction. However, it is preferred, at least in the case of the rearmost polarizer, to use a newer type of polarizing film that reflects the component of the light that is oscillating in the undesired direction. This reflected light will reenter the backlight 11, where it will be scattered and some will re-emerge with polarization components in the correct direction. The overall brightness of the display will thus be greater. Reflective polarizing film of this type is made by Minnesota Mining & Manufacturing (St. Paul, Minn.), and is called dual brightness enhancing film. It was developed for the purpose of "recycling" light polarized in the undesired direction as described above, thus increasing the brightness of a liquid crystal display.

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. An autostereoscopic display device comprising:
   an image forming device comprising a transmissive, electronically addressed liquid crystal display, the liquid crystal display including a liquid crystal layer addressable in an array of individual pixel elements;
   a first substrate comprising alternating strips, the alternating strips comprising strips having a first optical property which are separated by strips having a different, second optical property wherein the later strips are spaced according to the formula $p=2/((1/w)+(1/e))$ where p is slit pitch, w is pixel pitch in the horizontal direction of the LC layer in said electronically addressed liquid crystal display, and e is average separation of eyes of an observer, the first substrate optically disposed in front of the image forming device; and
   a second polarizing substrate optically disposed in front or behind the image forming device.

2. The device of claim 1 the first substrate comprising a polarizing substrate, said first polarizing substrate comprising alternating strips of polarization film separated by clear, nonpolarizing strips.

3. The device of claim 2, wherein said image forming device further comprises a backlight source.

4. The device of claim 3, wherein the alternating strips are arranged vertically.

5. The device of claim 4, wherein the width of the clear strips is about one-half a width of the strips of the polarization film.

6. The device of claim 4, further comprising a secondary liquid crystal panel including a liquid crystal layer without pixel structure where molecular orientation of the liquid crystals in the layer is changed by applying a voltage across said secondary liquid crystal panel.

7. The device of claim 6, comprising:
   a front polarizer disposed towards an observer of the device;
   said secondary liquid crystal panel disposed behind said front polarizer;
   said first polarizing substrate disposed behind said secondary liquid crystal panel;
   said image forming liquid crystal display disposed behind said first polarizing substrate;
   said second polarizing substrate disposed behind said image forming liquid crystal display; and
   said backlight source disposed behind said second polarizing substrate.

8. The device of claim 6, comprising:
   said first polarizing substrate disposed towards an observer of the device;
   said secondary liquid crystal panel disposed behind said first polarizing substrate;
   a front polarizer disposed behind said secondary liquid crystal panel;
   said image forming liquid crystal display disposed behind said front polarizer;
   said second polarizing substrate disposed behind said image forming liquid crystal display; and
   said backlight source disposed behind said second polarizing substrate.

9. The device of claim 2, wherein the nonpolarizing strips of the first polarizing substrate are colorless.

10. The device of claim 2, wherein the nonpolarizing strips of the first polarizing substrate are dyed to filter a desired degree of light passing therethrough.

11. The device of claim 1, wherein said image forming device comprises an emissive display, and the device further comprises a liquid crystal panel including a liquid crystal layer without pixel structure where molecular orientation of the liquid crystals in the layer is changed by applying a voltage across said liquid crystal panel, a first polarizing substrate comprising alternating strips of polarization film separated by clear, nonpolarizing strips, and a second polarizing substrate.

12. The device of claim 11, comprising:

said second polarizing substrate disposed towards an observer of the device;

said liquid crystal panel disposed behind said second polarizing substrate;

said first polarizing substrate disposed behind said liquid crystal panel; and said emissive display disposed behind said first polarizing substrate.

13. The device of claim 11, further comprising a liquid crystal panel including a liquid crystal layer without pixel structure where molecular orientation of the liquid crystals in the layer is changed by applying a voltage across said secondary liquid crystal panel.

14. The device of claim 13, wherein the display is switchable between autostereoscopic imaging and 2D viewing by application and removal of the voltage to the liquid crystal display without pixel structure.

15. The device of claim 1, wherein said first substrate comprises a light retardation substrate that includes first alternating strips that retard a component of linearly polarized light therethrough by one-half wavelength, said first strips separated by second alternating strips that retard a component of linearly polarized light therethrough by one wavelength.

16. The device of claim 15, wherein said image forming device comprises a transmissive, electronically addressed liquid crystal display, the liquid crystal display including a liquid crystal layer addressable in an array of individual pixel elements, and the device further comprises a backlight source.

17. The device of claim 16, wherein the alternating strips are arranged vertically.

18. The device of claim 17, wherein the one wavelength strips are spaced according to the formula $p=2/((1/w)+(1/e))$ where p is slit pitch, w is pixel pitch in the horizontal direction of the LC layer in said electronically addressed liquid crystal display, and e is average separation of eyes of an observer.

19. The device of claim 18, wherein the width of the one wavelength strips is about one-half a width of the one-half wavelength strips.

20. The device of claim 15, wherein said one-half wavelength strips are etched from the substrate between the one-wavelength strips.

21. The device of claim 20, wherein the first substrate further comprises a non-retardation laminate over the one-half and one wavelength strips, the laminate reducing diffraction and scattering of light from the junctures of the one-half and one wavelength strips.

22. The device of claim 15, further comprising a movable polarizer that is movable between an operable position, where the movable polarizer is optically disposed between the image forming device, and an inoperable position, where the movable polarizer is not optically disposed with respect to the image forming device, and wherein when the movable polarizer is placed in its operable position, autostereoscopic imaging is viewed by an observer, and when the movable polarizer is placed in its inoperable position, 2D imaging is viewed by the observer.

23. An autostereoscopic display device comprising:

an image forming device comprising display pixels arranged in rows and columns a transmissive, electronically addressed liquid crystal display, the liquid crystal display including a liquid crystal layer addressable in an array of individual pixel elements;

a first substrate comprising alternating strips, the alternating strips comprising strips having a first optical property which are separated by strips having a different, second optical property wherein the later strips are spaced according to the formula $p=2/((1/w)-(1/e))$ where p is slit pitch, w is pixel pitch in the horizontal direction of the LC layer in said electronically addressed liquid crystal display, and e is average separation of eyes of an observer, the first substrate optically disposed in behind the image forming device; and a second polarizing substrate optically disposed in front or behind the image forming device.

24. The device of claim 23, the first substrate comprising a polarizing substrate optically disposed in front or behind the image forming device, said fist polarizing substrate comprising alternating strips of polarization film separated by clear, nonpolarizing strips.

25. The device of claim 24, wherein the alternating strips are arranged vertically.

26. The device of claim 24, wherein the width of the clear strips is about one-half a width of the strips of the polarization film.

27. The device of claim 26, wherein the one wavelength strips are spaced according to the formula $p=2/((1/w)-(1/e))$ where p is slit pitch, w is pixel pitch in the horizontal direction of the LC layer in said electronically addressed liquid crystal display, and e is average separation of eyes of an observer.

28. The device of claim 23, wherein said first substrate comprises a light retardation substrate that includes first alternating strips that retard a component of linearly polarized light therethrough by one-half wavelength, said first strips separated by second alternating strips that retard a component of linearly polarized light therethrough by one wavelength.

* * * * *

UNITED STATES PATENT AND TRADEMARK OFFICE
CERTIFICATE OF CORRECTION

PATENT NO. : 6,590,605 B1
DATED : July 8, 2003
INVENTOR(S) : Eichenlaub, Jesse B.

It is certified that error appears in the above-identified patent and that said Letters Patent is hereby corrected as shown below:

Column 20,
Line 26, insert -- of claim 1 -- after "alternating strips".

Column 22,
Line 35, "fist" should read -- first --.

Signed and Sealed this

Twenty-fifth Day of November, 2003

JAMES E. ROGAN
*Director of the United States Patent and Trademark Office*